United States Patent
Wei et al.

(10) Patent No.: US 7,570,783 B2
(45) Date of Patent: Aug. 4, 2009

(54) METHOD AND SYSTEM FOR VEHICULAR GUIDANCE USING A CROP IMAGE

(75) Inventors: Jiantao Wei, Wichita, KS (US); Shufeng Han, Urbandale, IA (US)

(73) Assignees: Deere & Company, Moline, IL (US); Kansas State University Research Foundation, Manhattan, KS (US)

(*) Notice: Subject to any disclaimer, the term of this patent is extended or adjusted under 35 U.S.C. 154(b) by 659 days.

(21) Appl. No.: 11/303,383

(22) Filed: Dec. 16, 2005

(65) Prior Publication Data

US 2007/0003107 A1    Jan. 4, 2007

Related U.S. Application Data

(60) Provisional application No. 60/696,364, filed on Jul. 1, 2005.

(51) Int. Cl.
*G06K 9/00* (2006.01)
*G01C 22/00* (2006.01)

(52) U.S. Cl. .......................... 382/100; 382/164; 701/23

(58) Field of Classification Search ................ 382/100, 382/103, 104, 106, 107, 153, 162, 164, 165, 382/168, 173, 181, 193–203, 224, 232, 256, 382/274, 276, 286, 312, 305; 701/23, 28, 701/301; 700/50
See application file for complete search history.

(56) References Cited

U.S. PATENT DOCUMENTS

| | | | |
|---|---|---|---|
| 5,675,489 A * | 10/1997 | Pomerleau | 701/28 |
| 5,983,161 A | 11/1999 | Lemelson et al. | 701/301 |
| 6,275,773 B1 | 8/2001 | Lemelson et al. | 701/301 |
| 6,278,918 B1 * | 8/2001 | Dickson et al. | 701/23 |
| 6,336,051 B1 * | 1/2002 | Pangels et al. | 700/50 |
| 6,385,515 B1 | 5/2002 | Dickson et al. | 701/28 |

(Continued)

FOREIGN PATENT DOCUMENTS

AU       691051      6/1996

(Continued)

OTHER PUBLICATIONS

Reid, J.F.; and Searcy, S.W. *An Algorithm for Computer Vision Sensing of a Row Crop Guidance Directrix,* International Off-Highway & Powerplant Congress and Exposition, 1991, pp. 1-13.

(Continued)

*Primary Examiner*—Seyed Azarian

(57) ABSTRACT

The method and system for vehicular guidance comprises an imaging device for collecting color image data to facilitate distinguishing crop image data (e.g., crop rows) from background data. A definer defines a series of scan line segments generally perpendicular to a transverse axis of the vehicle or of the imaging device. An image parameter evaluator determines scan line image parameter data for each of the scan line segments. An alignment detector (e.g., search engine) identifies a preferential heading of the vehicle that is generally aligned with respect to a crop feature, associated with the crop image data, based on the determined scan line image parameter meeting or exceeding a maximum value or minimum threshold value. A reliability estimator estimates a reliability of the vehicle heading based on compliance with a criteria for scan line image parameter data associated with one or more crop rows.

20 Claims, 17 Drawing Sheets

U.S. PATENT DOCUMENTS

| | | | |
|---|---|---|---|
| 6,445,983 | B1 | 9/2002 | Dickson et al. ............... 701/23 |
| 6,487,500 | B2 * | 11/2002 | Lemelson et al. ........... 701/301 |
| 6,490,539 | B1 | 12/2002 | Dickson et al. |
| 6,721,453 | B1 * | 4/2004 | Benson et al. .............. 382/199 |
| 6,728,608 | B2 * | 4/2004 | Ollis et al. .................... 701/28 |
| 6,819,780 | B2 | 11/2004 | Benson et al. |
| 7,058,197 | B1 | 6/2006 | McGuire et al. |
| 7,233,683 | B2 | 6/2007 | Han et al. |
| 7,242,791 | B2 | 7/2007 | Han et al. |
| 7,496,228 | B2 | 2/2009 | Landwehr et al. |
| 2002/0106108 | A1 | 8/2002 | Benson et al. |
| 2004/0039498 | A1 | 2/2004 | Ollis et al. .................... 701/23 |
| 2005/0025357 | A1 | 2/2005 | Landwehr et al. |
| 2005/0088642 | A1 | 4/2005 | Singh et al. ................ 356/5.01 |
| 2005/0102079 | A1 | 5/2005 | Hofer et al. |
| 2006/0095207 | A1 | 5/2006 | Reid |

FOREIGN PATENT DOCUMENTS

| | | |
|---|---|---|
| EP | 1 529 428 A1 | 5/2005 |
| WO | 96/17279 | 6/1996 |
| WO | 03/098260 | 11/2003 |

OTHER PUBLICATIONS

Pomerleau, D. Ralph: Rapidly Adapting Lateral Position Handler, IEEE Symposium on Intelligent Vehicle, Detroit, MI [online], 1995 [retrieved Nov. 18, 2005]. Retrieved from the Internet: <URL:www.cs.cmu.edu/~tjochem/nhaa/ralph.html>.

Jahns, G. *Navigating of Agricultural Field Machinery,* Computers and Electronics in Agriculture, 1999, pp. 1-2.

Reid, J.F.; Zhang, Q.; Noguchi, N.; Dickson, M. *Agricultural Automatic Guidance Research in North America,* Computers and Electronics in Agriculture, 2000, pp. 155-167.

Marchant, J.A. *Tracking of Row Structure in Three Crops Using Image Analysis,* Computers and Electronics in Agriculture, 1996, pp. 161-170.

Astrand, B.; Baerveldt, A. *A Vision Based Row-Following System for Agricultural Field Machinery,* Mechatronics, 2005, pp. 251-269.

Han, S.; Zhang, Q.; Ni, B.; Reid, J.F. *A Guidance Directrix Approach to Vision-Based Vehicle Guidance Systems,* Computers and Electronics in Agriculture, 2004, pp. 179-195.

Wei, J.; Han, S.; Rovira-Mas, F.; Reid, J.F. *A Method to Obtain Vehicle Guidance Parameters from Crop Row Images.* 2005, ASAE Annual International Meeting, Tampa, FL, USA. ASAE Paper No. 051155.

Rovira-Mas, F.; Han, S.; Wei, J.; Reid, J.F. *Fuzzy Logic Model for Sensor Fusion of Machine Vision and GPS in Autonomous Navigation,* 2005, ASAE Annual International Meeting, Tampa, FL, USA. ASAE Paper No. 051156.

Ollis, M.; Stentz, A. *Vision-Based Perception for an Automated Harvester.* Robotics Institute, Carnegie Mellon University, (1998).

Zhang, F.M.; Ying, Y.B.; Zhang, Q. *A Robust Approach to Obtain a Crop Edge Based on Wavelet Filter and Fuzzy Recognition.* Automation Technology for Off-Road Equipment, Proceedings of the Oct. 7-8, 2004 Conference, ASAE Publication No. 701P1004, 2004, pp. 36-46.

Rovira-Mas, F.; Zhang, Q.; Reid, J.F.; Will, J.D. *Machine Vision Row Crop Detection Using Blob Analysis and the Hough Transform.* Automation Technology for Off-Road Equipment, Proceedings of the Jul. 26-27, 2002 Conference, ASAE Publication No. 701P0502.

Tsai, R. *An Efficient and Accurate Camera Calibration Technique for 3D Machine Vision.* IBM, T.J. Watson Research Center, 1986, pp. 364-373.

Pinto, F.A.C.; Reid, J.F. *Heading Angle and Offset Determination Using Principal Component Analysis.* 1998. ASAE Paper No. 983113.

Jochem, T.; Batavia, P. *Crop Tracking Phase 2 Final Report.* Applied Perception, Inc., (2002).

Ollis, M.; Stentz, A. *First Results in Vision-Based Crop Line Tracking.* Robotics Institute, Carnegie Mellon University, (1996).

Zhang, Q.; Reid, J.F.; Noguchi, N. *Agricultural Vehicle Navigation Using Multiple Guidance Sensors,* (1999).

Okamoto, H.; Hamada, K.; Kataoka, T.; Terawaki, M.; Hata, S. *Automatic Guidance System with Crop Row Sensor.* Automation Technology for Off-Road Equipment, Proceedings of the Jul. 26-27 Conference. ASAE Publication No. 701P0502, 2002.

Southall, B.; Marchant, J.A.; Hague, T.; Buxton, B.F. *Model Based Tracking for Navigation and Segmentation.* Silsoe Research Institute, (1998).

Taylor, S. Intel Integrated Performance Primitives, How to Optimize Software Applications Using Intel IPP. Intel Press, 2004, pp. 207-293.

* cited by examiner

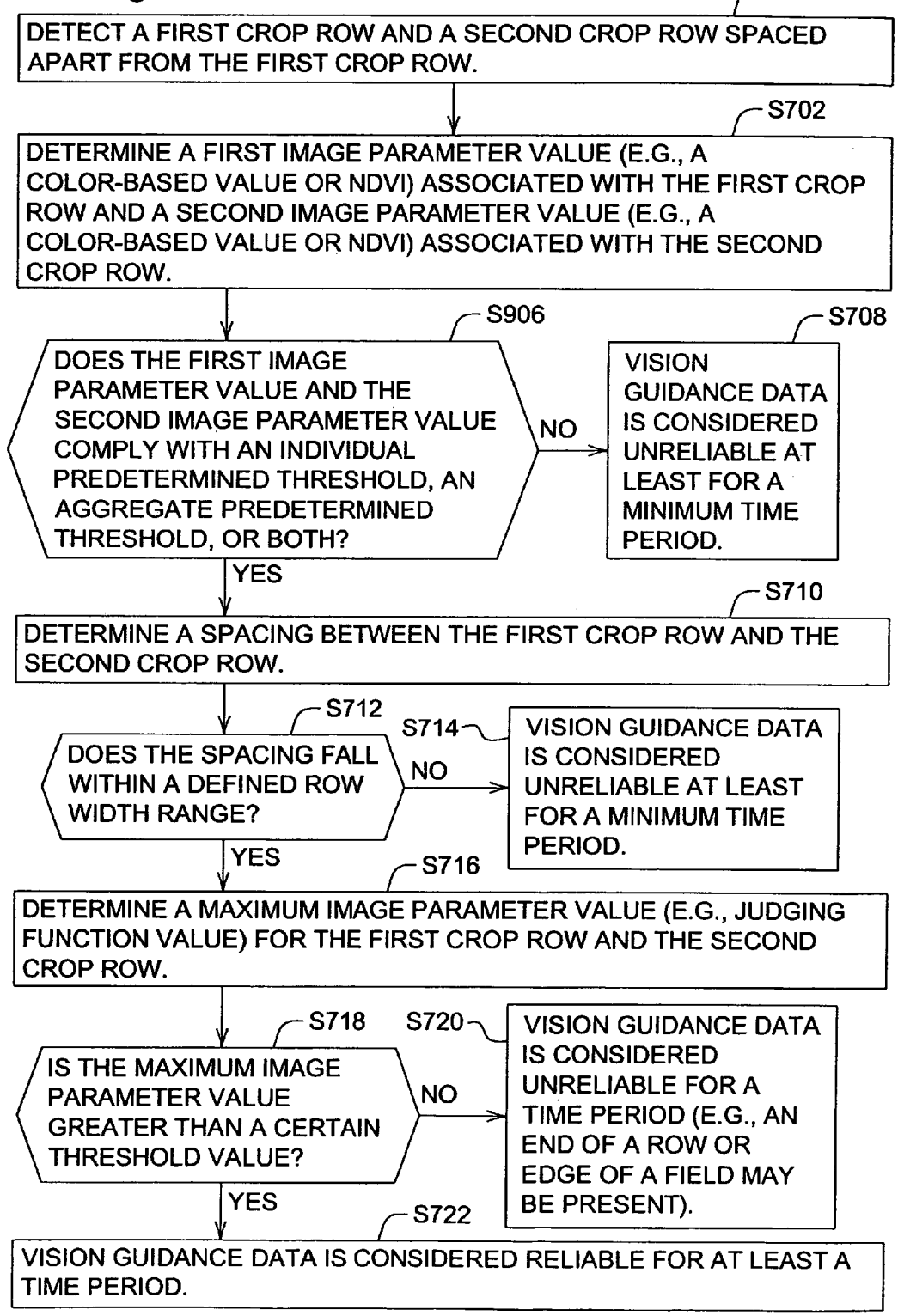

METHOD AND SYSTEM FOR VEHICULAR GUIDANCE USING A CROP IMAGE

This document (including all drawings) claims priority based on U.S. provisional application Ser. No. 60/696,364, filed Jul. 1, 2005, and entitled, METHOD AND SYSTEM FOR VEHICULAR GUIDANCE USING A CROP IMAGE under 35 U.S.C. 119(e).

FIELD OF THE INVENTION

This invention relates to a method and system for vehicular guidance using a crop image.

BACKGROUND OF THE INVENTION

A vision system may attempt to infer the relative position of a vehicle with respect to a crop image (e.g., crop rows or crop cut/uncut edge). However, background art vision systems may require excessive computational resources or tend to respond too slowly for real-time navigation of a vehicle. Further, vision systems may be inaccurate because of variations or discontinuities in the crop rows or crop cut/uncut edge. Therefore, a need exists for a robust vision system for vehicle guidance that is less computationally demanding, more responsive, and more resistant to guidance errors associated with variations in the crop.

SUMMARY OF THE INVENTION

The method and system for vehicular guidance comprises an imaging device for collecting color image data to facilitate distinguishing crop image data (e.g., crop rows) from background data. A definer defines a series of scan line segments generally perpendicular to a transverse axis of the vehicle or of the imaging device. An image parameter evaluator determines a scan-line-image parameter level for each of the scan line segments. An alignment detector (e.g., search engine) identifies a preferential heading of the vehicle that is generally aligned with respect to a crop feature, associated with the crop image data, based on the determined scan line image parameter level meeting or exceeding a maximum value or minimum threshold value. A reliability estimator estimates a reliability of the vehicle heading based on compliance with a image parameter level criteria associated with one or more crop rows.

BRIEF DESCRIPTION OF THE DRAWINGS

FIG. 9 is a flow chart of a third embodiment of a method for determining reliability of vision data for guiding a vehicle.

DESCRIPTION OF THE PREFERRED EMBODIMENT

Figure 1:
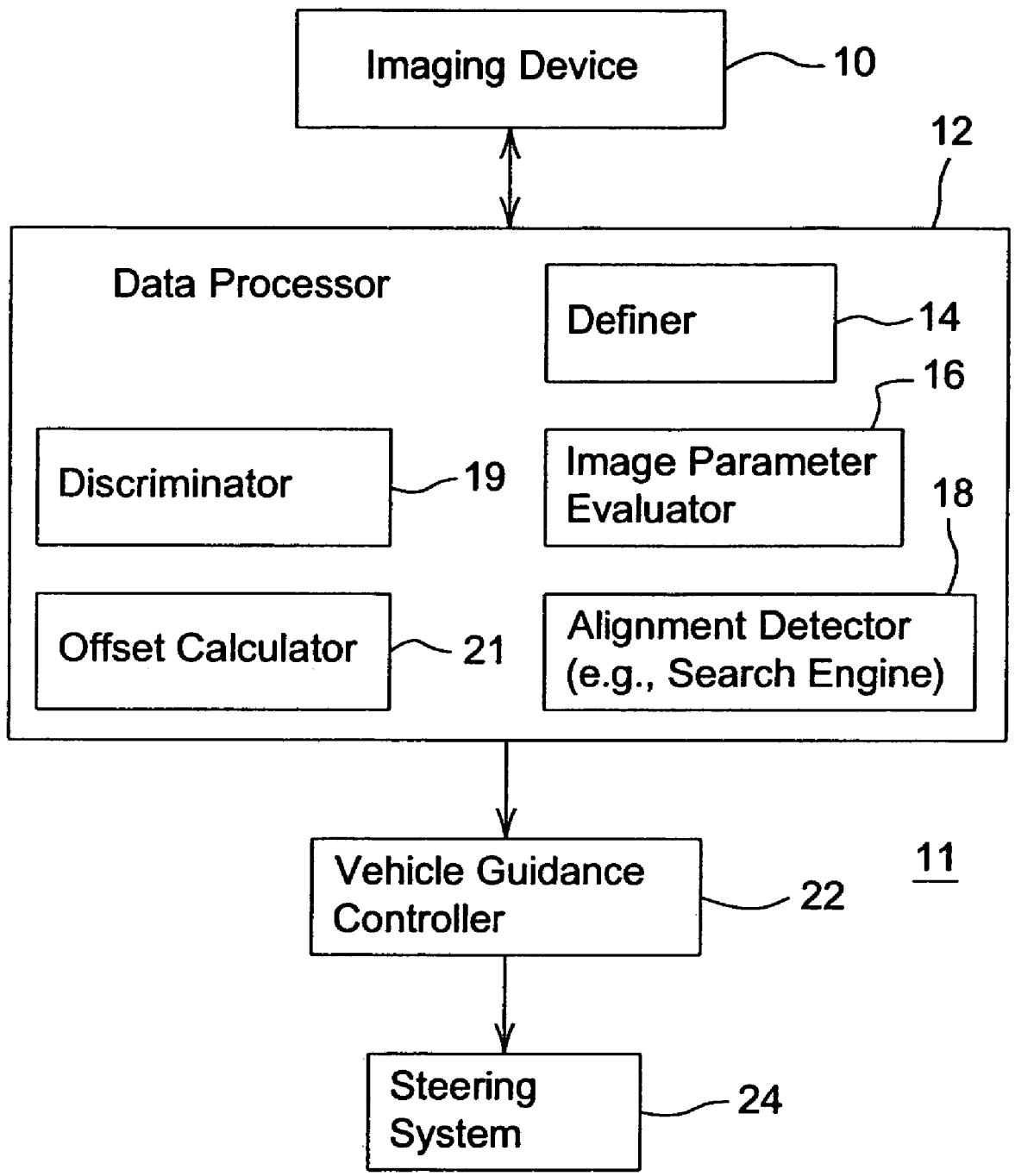
FIG. 1 is a block diagram of one embodiment of a system for vehicular guidance.

In accordance with one embodiment of the invention, FIG. 1 shows a vehicular guidance system 11 that comprises an imaging device 10 coupled to a data processor 12. The data processor 12 communicates with a vehicle guidance controller 22. In turn, the vehicle guidance controller 22 directly or indirectly communicates with a steering system 24.

The imaging device 10 is used to collect one or more images from the perspective of a vehicle. The image may contain crop image data, background data, or both. The crop image data may contain one or more crop rows, a harvested swath, a transition between a cut crop and uncut crop, a transition between a harvested and unharvested crop, a crop edge, or another crop reference feature. The data processor 12 may process the collected images to identify the relative position of a vehicle with respect to the crop reference feature (e.g., crop rows).

The imaging device 10 may comprise a camera using a charged-coupled device (CCD), a complementary metal oxide semiconductor (CMOS), or another sensor that generates color image data, RGB color data, CMYK color data, HSV color data, or image data in other color space. RGB color data refers to a color model in which red, green and blue light (or signals or data representative thereof) are combined to represent other colors. Each pixel or group of pixels of the collected image data may be associated with an image parameter level or a corresponding pixel value or aggregate pixel value. In one embodiment, the image parameter level is an indicator of or measure of an image parameter that is observed, reflected and/or emitted from one or more objects or any portion of one or more objects within a scene or within an image (e.g., a raw or processed image) representing the scene, or portion thereof.

In general, an image parameter means an attribute of image data (e.g., raw or processed image data), an attribute of a pixel or group (e.g., an array or matrix) of pixels, a parameter of image data, or a parameter of pixel or group (e.g., an array or matrix) of pixels, an attribute of voxel or group (e.g., a multidimensional matrix) of voxels, a parameter of a voxel, or group (e.g., a multidimensional matrix) of voxels. For example, image parameter includes, but is not limited to, any of the following: color, color content, color composition, pixel color, voxel color, a color-related parameter, hue, pixel hue, voxel hue, saturation, pixel saturation, greenness, pixel greenness, grayness, color vibrancy, color shade, green-red difference, a ratio or index of plant color to reference plant color, NDVI (normalized difference vegetation index), and pixel NDVI. The NDVI (normalized difference vegetation index) is an index that facilitates comparing vegetation greenness between different images or different portions of the same image. NDVI may be determined in accordance with the following equation: $NDVI=(I_{NIR}-I_R)/(I_{NIR}+I_R)$, where $I_{NIR}$ is the intensity of reflection in near-infrared frequency band, and $I_R$ is intensity of reflection in red color frequency band for humanly visible light. $I_{NIR}$ may be expressed as a percentage of the reflected radiation in the infra-red band with respect to incident infra-red radiation; $I_R$ may be expressed as a percentage of the reflected radiation in the red color band. NDVI values typically range between 0.1 and 0.7. Higher index values may be associated with higher levels of healthy vegetation cover. The green-red difference is a difference between a green component value and a red component value of a pixel or a group of pixels in an image.

The image parameter level may be associated with or derived from one or more of the following: a color value of a red component, green component, or blue component in RGB color space; a composite color value of multiple components in RGB color space, a hue value in the HSV color space; a hue value in the HSL color space; a saturation value associated with vibrancy or purity of a color, a saturation value in HSV or HSL color space, a value indicative of observed or reflected light in the green visible light spectrum or for another plant color; a value indicative of observed or reflected light with certain green hue value or another plant color; and a value indicative of observed or reflected light in multiple spectrums (e.g., green light and infra-red or near infra-red light), an NDVI (normalized difference vegetation index), a greenness level, a plant color level, a green-red difference level, or any color-related parameter, or any value of an image attribute associated with image data. For RGB color data, each pixel may be represented by independent values of red, green and blue components and corresponding image parameter level data. CMYK color data mixes cyan, magenta, yellow and black (or signals or data representative thereof to subtractively form other colors. HSV (hue, saturation, value) color data defines color space in terms of the hue (e.g., color type), saturation (e.g., vibrancy or purity of color), and value (e.g., brightness of the color). For HSV color data, the value or brightness of the color may represent the image parameter level. HSL color data defines color space in terms of the hue, saturation, and luminance (e.g., lightness). Lightness or luminance may cover the entire range between black to white for HSL color data. The image parameter level may be associated with a particular color, such as green, or a particular shade or hue within the visible light spectrum associated with green, or other visible colors, infra-red radiation, near-infra-red radiation, or ultraviolet radiation associated with plant life.

An image parameter level may also be referred to as image parameter value. An image parameter level may describe one or more pixels or voxels, or one or more scan line segments, as the context requires. A scan-line-image-parameter level refers to the image parameter level associated with a particular corresponding scan line segment, typically with a certain attitude (e.g., in one or more dimensions) relative to a reference frame or reference coordinate system.

Although other imaging devices may be used, one illustrative example of an imaging device 10 is a SONY DFW-X710 camera (SONY Electronics Inc., Park Ridge, N.J.). The imaging device 10 may be associated with a transverse axis and may be associated with scan lines of the image data that extend generally perpendicular to the transverse axis.

The scan lines represent a group of generally parallel line segments which may extend into the depth of the world coordinate system with respect to the imaging device 10. Each scan line segment is separated from an adjacent scan line segment by a spatial separation (e.g., predetermined spatial separation). In one embodiment, the scan line segments are generally bounded by a rectangle search region (e.g., which may be defined in terms of Xmin, Xmax, Ymin, Ymax); the length of scan line segment is limited by the depth dimension (Ymin, Ymax) in the world space. Further, in one embodiment each scan line may be represented as a two-dimensional array of pixel values or image parameter levels.

The scan lines are not transmitted by the imaging device 10, but are received by the imaging device 10 within at least one of the visible light spectrum, the infra-red light spectrum, the near infra-red light spectrum, and the ultraviolet light spectrum. If the imaging device 10 collects data over both the visible light spectrum and the infra-red spectrum, it is possible to assess the crop color in greater detail than with visible light alone. Although the maximum number of scan lines may be determined based on the maximum resolution of the imaging device 10, in one illustrative configuration, the number of scan lines may be reduced from the maximum number available to reduce the processing resources or computational resources required by the data processor 12.

In one embodiment, the data processor 12 comprises a discriminator 19, a definer 14, an image parameter evaluator 16, an alignment detector 18 (e.g., search engine), and an offset calculator 21. The discriminator 19 facilitates distinguishing crop image data (e.g., crop rows) from background image data. The crop rows in crop image data may comprise any crop or plant that is arranged in rows, such as corn, soybeans, cotton, or the like. The background image data may comprise the ground, soil, vegetation other than the crop rows, the sky or horizon, buildings, vehicles, among other possibilities. The discriminator 19 facilitates distinguishing a primary color (e.g., green) of the crop image data (e.g., crop rows) with respect to a secondary color or colors (e.g., earth tones or non-green colors) of the background image data. The discrimination may assign a discrimination value to each pixel of the image data, a corresponding bit map, or another data representation. Each discrimination value indicates whether a bit is crop image data or not, or a probability indicative of whether or not a bit is crop image data.

The definer 14 may define the orientation and configuration of scan lines with respect to the vehicle. The definer 14 may relate the imaging coordinates of the scene with the vehicular coordinates of scene or real world coordinates. If the imaging device 10 is mounted in a fixed position with respect to the vehicle, the vehicular coordinates of the scene and the imaging device 10 may be related by a translation and rotation in two or three dimensions.

An image parameter evaluator 16 determines the image parameter level of various points that lie on or along the scan lines in the collected image data. The image parameter level may be indicated by the value of pixels or voxels associated with crop image data in HSV color space, by the green value of pixels or voxels in RGB color space, or by another value or indicator of a color-related parameter.

For each scan line segment on the image space, an average value or mean value of scan line image parameter (or pixel values) may be used as the image parameter level (or pixel level). The image parameter evaluator 16 determines an average value or mean value for the image parameter level or pixel level by summing substantially all (or most) of the pixel values (e.g., derived from image parameter level) that are on the scan line segment and dividing the sum by the number of pixels associated with the scan line segment, or an estimate thereof. The scan line segment may have two or more states or values for each pixel (e.g., sufficient image parameter level versus insufficient image parameter level or a green value versus a non-green value). Because of the perspective view of the scan lines, the fixed length (which may be expressed as the difference between Ymax and Ymin), when projected to the image space no longer appears to be fixed. Accordingly, the mean or average value of the scan-line-image-parameter level or pixel level represents an objective score of a scan line image parameter in image space that is not affected by any potential perceived change in the fixed length of the scan lines from a perspective view.

The alignment detector 18 determines whether or not the vehicle heading is aligned with the crop rows. The scan line segments may be virtually projected onto or into the image space based on hypothesized attitude (e.g., yaw, pitch, and roll angles) in two or more dimensions within a search space to determine a preferential attitude in (e.g., yaw, pitch, and roll angle) in two or more dimensions that indicates substantial alignment of the scan lines with crop rows, crop beds, spatial planting arrangements of crops, or other crop features, for example. In one example, the alignment detector 18 comprises a search engine for searching the image parameter (e.g., a color-related parameter value or NDVI) level data for a maximum image parameter level that corresponds to a desired heading of the vehicle. Respective image parameter level data may be associated with a corresponding scan line or a corresponding segment thereof. The scan lines may be identified by scan line identifier or spatial coordinates, either in the image space of the imaging device 10 or real world. The image parameter level data may be defined as an aggregate image parameter level associated with a corresponding segment of a scan line or the average, mean or mode image parameter level of a corresponding segment of a scan line may be tracked.

The alignment detector 18 or data processor determines a preferential heading, a vehicular offset, or both for the vehicle. The preferential heading angle is the angle between the vehicle centerline and the desired path. The desired path may be associated with a tire, wheel, or track of the vehicle traveling in or over the ground or area between adjacent crop rows and generally parallel to the crop rows. The vehicular offset refers to the displacement or distance the vehicle is off from the desired path of a vehicle. For instance, the vehicular offset may refer to the displacement of a reference point on the vehicle (e.g., vehicle COG (center of gravity)) with respect to the desired path. The vehicular offset of the vehicle with respect to the crop image data is generally much smaller than the lateral view range of the imaging device 10. For example, one typical row spacing for soybean or corn is 76 cm (30 inches), although other row spacings and planting configurations are possible. If the vehicle is laterally shifted one row, the guidance information after such shift will be about the same as that before shifting.

In one configuration, the alignment detector 18 determines a preferential heading angle for a time interval and the offset calculator 21 determines a corresponding vehicular offset for time interval or a generally overlapping time interval. The vision guidance system 11 may be used to infer the relative position of the vehicle with respect to a crop feature, such as crop rows, a tillage ridge, or a crop cut/uncut edge. In addition, the vision guidance system 11 may be configured to detect the end of the row, to detect obstacles, or to detect weed infested areas.

The vehicle guidance controller 22 may determine guidance parameters for the vehicle based on the preferential heading, the vehicular offset, or both. The guidance parameters may comprise control signals, error signals, control data, error data messages, or the like that contain information on the preferential heading angle and vehicular offset to control steering. For example, the control signals may comprise a steering control signal or data message that is time dependent and defines a steering angle of the steering shaft.

The vehicle guidance controller 22 uses the guidance parameters or directrix to control the steering system 24. For example, the guidance parameters may direct the vehicle generally parallel to crop rows, a crop edge, or another crop feature.

The steering system 24 may comprise an electrically controlled hydraulic steering system, an electrically driven rack-and-pinion steering, an Ackerman steering system, or another steering system. The steering system 24 may actuate an electro-hydraulic (E/H) unit or another actuator to turn one or more wheels.

Figure 2:
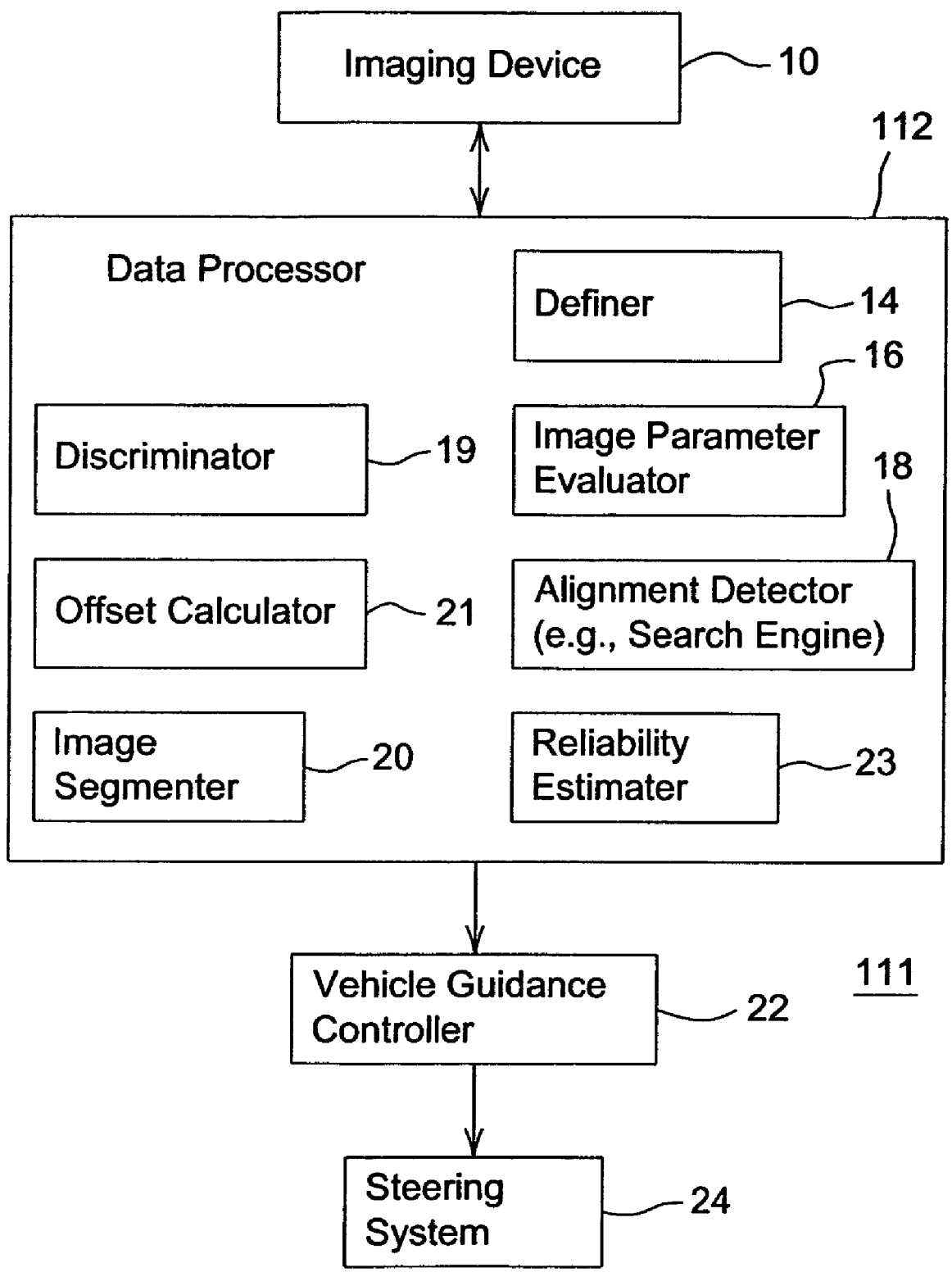
FIG. 2 is a block diagram of another embodiment of a system for vehicular guidance.

The vehicular guidance system 111 of FIG. 2 is similar to the vehicular guidance system 11 of FIG. 1, except the vehicular guidance system of FIG. 2 further comprises an image segmenter 20 and a reliability estimator 23. The discriminator 19 may cooperate with the image segmenter 20 to produce a segmented image. The image segmenter 20 may remove or filter information from the color collected image data to produce a grey-scale, mono-chrome, color, HSV or other segmented image data that excludes background data or all scene data outside of the crop rows or crop image data. For example, the segmented image data may be expressed as binary image data, where a pixel value may have one of two states (e.g., sufficient image parameter value or insufficient image parameter value; green value or non-green value).

The reliability estimator 23 estimates a reliability of the preferential vehicle heading based on compliance with an image parameter level criteria associated with one or more crop rows of crop image data. The reliability estimator 23 may use one or more of the following factors to determine whether or not a preferential heading derived from vision data is sufficiently reliable for guidance of a machine during a time interval or period: (1) whether the image parameter value (e.g., a first image parameter value) of a first crop row differs from the image parameter value (e.g., a second image parameter value) of a second crop row by more than a minimum threshold; (2) whether the spacing between a first crop row and a second crop row falls within a defined row width range; (3) whether a maximum image parameter value of the first crop row and the second crop row is greater than a certain threshold value; and (4) whether the image parameter value (e.g., designated a first image parameter value) of a first crop row and the image parameter value (e.g., second image parameter value) of a second crop row are individually or collectively less than a corresponding predetermined threshold. The reliability estimator 23 may use one or more of the following factors to determine whether or not a vehicular offset derived from vision data is sufficiently reliable for guidance of a machine during a time interval or period: (1) whether the determined offset is less than or equal to a maximum offset value; and (2) whether the determined offset is less than or equal to a spacing between adjacent rows.

Figure 3:
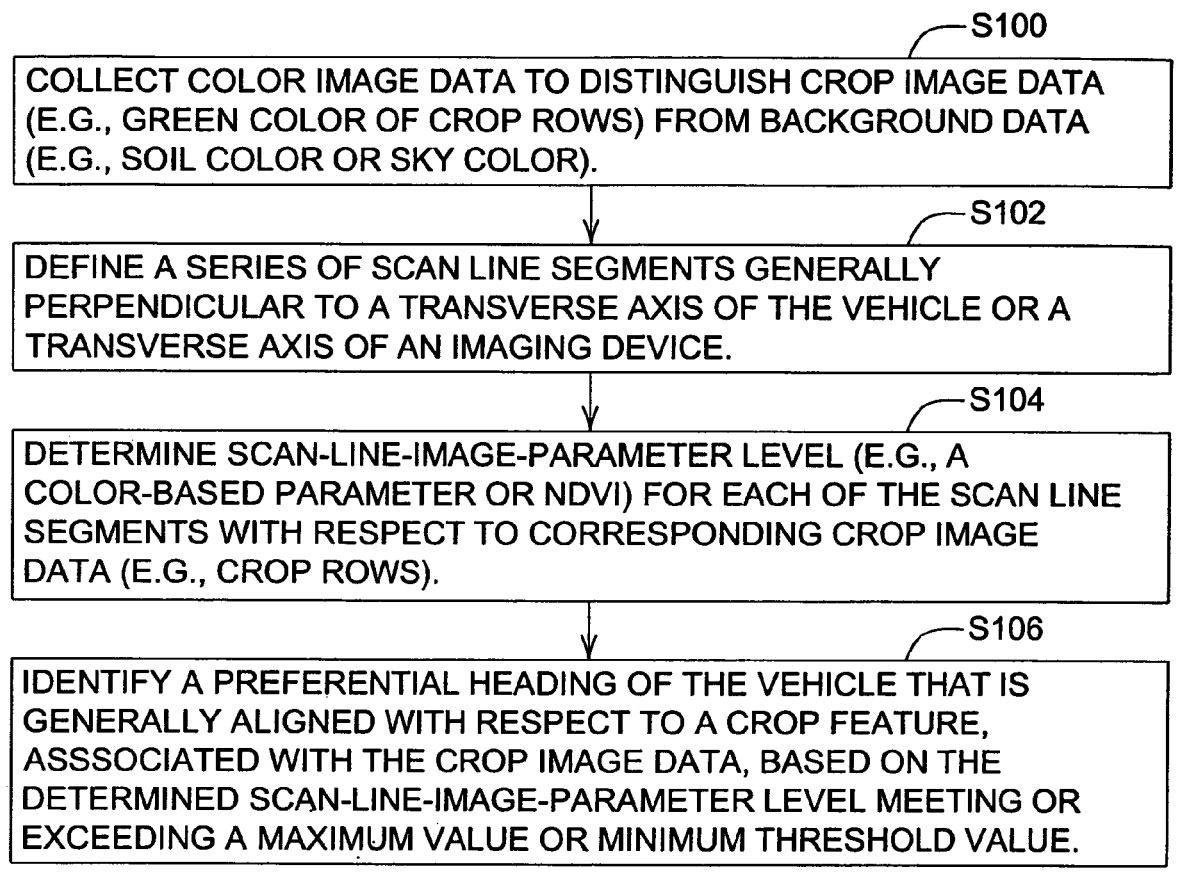
FIG. 3 is a flow chart of first embodiment of a method for guiding a vehicle using a crop image data (e.g., crop row data).

FIG. 3 shows a method for guiding a vehicle using crop image data (e.g., crop rows). The method of FIG. 3 begins in step S100.

Figure 11A:
FIG. 11A is an illustrative example of an original crop image.
Figure 11B:
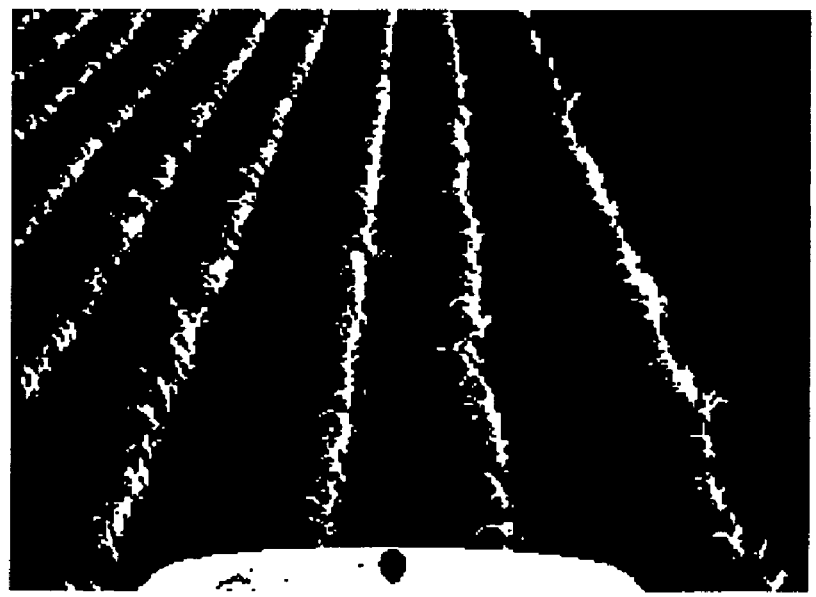
FIG. 11B is an illustrative example of a segmented image derived from the original crop image of FIG. 11A.

In step S100, the imaging device 10 collects color image data to distinguish crop image data (e.g., crop row data) from background data. The crop image data or crop row data may be characterized by its green color content (e.g., green visible light or NDVI (normalized difference vegetation index)), whereas the background data may be characterized by other color content, such as soil colors, brown, black, grayish black, red-brown, earth-tones, or sky color. The NDVI is an index that facilitates comparing vegetation greenness between different images or different portions of the same image. NDVI may be determined in accordance with the following equation: $NDVI=(I_{NIR}-I_R)/(I_{NIR}+I_R)$, where $I_{NIR}$ is the intensity of reflection in near infrared band, and $I_R$ is intensity of reflection in red band. $I_{NIR}$ may be expressed as a percentage of the reflected radiation in the infra-red band with respect to incident infra-red radiation; $I_R$ may be expressed as a percentage of the reflected radiation in the red band. NDVI values typically range between 0.1 and 0.7. Higher index values may be associated with higher probability or likelihood of a pixel or image portion being green or vegetation. FIG. 11A provides an illustrative example of the collected color image data, which will be described later in more detail.

Where the color image data comprises RGB data or is convertible into RGB data, step S100 may be carried out in the following manner. During the growing season, the crop rows (e.g., corn plants) appear green while the background (e.g., soil) appears generally dark brown, generally black, non-green, or another reference soil color. Therefore, the relative or absolute greenness of the objects in the image data may be used as the segmentation or discrimination criteria. The green-red difference ($D_{g-r}$) may be defined as $D_{g-r}=G-R$. The green-blue difference ($D_{g-b}$) may be defined as $D_{g-b}=G-B$, where R, G, B are the pixel's red, green and blue component, respectively. If a particular pixel's $D_{g-r}$ is greater than a first threshold value and if the particular pixel's $D_{g-b}$ is greater than a second threshold value in the collected image data, then that particular pixel is classified as a crop image pixel (e.g., crop row pixel). Otherwise, that particular pixel is classified as background data (e.g., soil). The first threshold value may be established by field tests, empirical studies or otherwise. Similarly, the second threshold value may be established by field tests, empirical studies, or otherwise. FIG. 11B shows an illustrative example of a segmented image that is derived from the output of the discriminator 19 or the collected color image of FIG. 11A.

Step S100 may be used to reduce the data processing capability and burden on the data processor by filtering out background data from further consideration or processing. Further, any of the methods disclosed herein in FIG. 3 through 6, inclusive, may be executed without step S100 by relying on the subsequent steps (e.g., step S106 in FIGS. 3, 4 and 6 and step S108 in FIG. 5) to discriminate between image data and background data in the collected image data.

In step S102, a definer 14 or data processor 12 defines a series of scan line segments generally perpendicular to a transverse axis of the vehicle or to an imaging transverse axis of an imaging device 10. For example, the scan lines project out from the front of the vehicle in a direction of travel toward crop rows. The definer 14 or data processor 12 may align an imaging coordinate system of the scene with a vehicle coordinate system of the scene.

In step S104, an image parameter evaluator 16 determines a scan-line image-parameter level (or other scan line image parameter data) for each of the scan line segments with respect to corresponding crop image data (e.g., crop rows). Step S104 may be carried out in accordance with various techniques that may be applied independently or cumulatively.

Under a first technique, the image parameter evaluator 16 determines an average or mean scan-line-image-parameter level for a corresponding segment of a scan line associated with the collected image data. The image parameter evaluator 16 may determine the average or mean scan line image parameter for each scan line or segment that is in the field of view or a certain group of scan lines in the vicinity of a crop feature.

Under a second technique, the image parameter evaluator 16 determines a mode scan-line-image-parameter level for a corresponding segment of a scan line. The image parameter evaluator 16 may determine the mode scan line image parameter for each scan line (or segment) that is in the field of view or a certain group of scan lines in the vicinity of a crop feature of interest.

Under a third example, the image parameter evaluator 16 determines an aggregate scan-line-image-parameter level for a corresponding segment of a scan line. Here, the image parameter evaluator 16 may determine a sum of the image parameter values associated with each pixel or voxel along a scan line or generally intercepting it.

In step S106, an alignment detector 18 (e.g., search engine) identifies a preferential heading of the vehicle that is generally aligned with respect to a crop feature (e.g., crop rows), associated with the image data (e.g., crop image data associated with or identified in step S100), based on the determined scan-line-image-parameter level (e.g., a hue value, saturation value, green-red difference, plant color value, NDVI, or other color-related parameter) meeting or exceeding a maximum value (e.g., an NDVI within a range between 0.5 and 0.7) or minimum threshold value (e.g., an NDVI within a range between 0.1 and 0.3). The maximum value may comprise a reference value that is associated with a first reliability level (e.g., 99 percent reliability or probability) of identifying a maximum image parameter level (or sufficiently high image parameter level indicative of substantial alignment with a crop feature) of a scan line or group of pixels in the image data under defined ambient light conditions. The minimum threshold value may comprise a reference value that is associated with a second reliability level (e.g., 95 percent reliability or probability) in identifying a maximum image parameter level (or sufficiently high image parameter level indicative of substantial alignment with a crop feature) of a scan line or group of pixels in the image data under defined ambient light conditions, where the second reliability level is lower than the first reliability level. The maximum value and the minimal threshold value may be determined by empirical studies, trial-and-error, field tests, or otherwise, and may vary with the type of vegetation (e.g., corn versus soybeans), vegetation status or health (e.g., plant tissue nitrogen level) and the ambient lighting conditions, for instance.

Where the NDVI, a measure of greenness, or another color-related parameter is used, the maximum value and the minimum threshold value may be indicative of crop health, condition, or status. Crop health, condition or status may be influenced by interaction between one or more of the following genetic, environmental, and management factors: seed genetic composition (e.g., genetic resistance to pests, diseases, or drought), plant variety or species, crop input application (e.g., rate, timing, concentration), nitrogen application practices, weather, climate, precipitation (e.g., amount and frequency), temperature, frost dates, growing degree days, planting date, current date, anticipated harvesting or crop maturity date, and other agronomic factors. The preferential heading comprises a desired heading of the vehicle consistent with a desired path of travel of the vehicle. If the vehicle is in a generally aligned state with respect to a crop feature, a vehicle may track a desired path that is generally parallel to a crop row as a determined crop feature or a crop edge. A crop edge represents a transition between a harvested crop and an unharvested crop.

In one example of carrying out step S106, the alignment detector 18 may comprise a judging function to search candidate vehicle headings (e.g., candidate heading angles) to select the preferential heading based on image parameter variations among a series of parallel scan lines. For example, the judging function may use one or more of the following: (1) a derivative of the image parameter level of a corresponding scan line segment associated with a particular respective attitude within a search space or a portion thereof, (2) multiple derivatives of the image parameter levels associated with corresponding scan line segments for different attitudes (e.g., hypothesized attitudes) of the scan lines, (3) an average of the derivatives of image parameter level of a corresponding scan line segment for different attitudes of the scan lines, and (4) a sum of derivatives of the image parameter level of a corresponding scan line segment associated with a particular respective attitude within a search space or portion thereof, and (5) another score to compare a set of scan line segments for corresponding attitudes (e.g., hypothesized attitudes or a set of hypothesized attitude yaw, pitch and roll angles). Multiple derivatives or scores may be determined for different orientations (e.g., hypothesized attitudes or ranges of hypothesized attitudes) of each scan line segment over the entire transverse axis range or X-axis range (e.g., from Xmin to Xmax) with respect to a vehicle's direction of travel, or over some portion of interest of the transverse axis range. Each score gives a measure or indicator as to which set of hypothesized attitude (or set yaw, roll and pitch angles) constitutes a preferential attitude (or preferential set of yaw, roll and pitch angles) for alignment of the scan line segments with the crop image data (e.g., crop rows). If a derivative meets or exceeds a threshold, or if a sum of derivatives of the image parameter level meets or exceeds a threshold, or if another score for a scan line meets or exceeds a threshold, the scan lines may be regarded as generally aligned or registered with the crop image data or crop feature (e.g., the crop rows as shown in FIG. 12B). In an alternative embodiment, the judging function might use another measure of alignment such as the peaks or local amplitude variation associated with the scan line image parameter to align the scan line segments with the crop rows or crop image data. The alignment detector 18 or data processor 12 may calculate the vehicular offset after the preferential heading (e.g., desired heading angle) is found, consistent with the preferential alignment of the scan line segments with the crop image data (e.g., crop rows).

In step S106, the alignment detector 18 may comprise a search engine that applies a heading searching algorithm to search $N_\phi$ yaw angles and $N_\omega$ pitch angles. For each (yaw angle, pitch angle) combination, there may be $N_x$ scan lines with $N(\phi,x)$ points. The summation of pixel's image parameter value on a scan line (or segment thereof may be used as a value for the image parameter of a corresponding scan line.

The total possible search space to determine the preferential heading for a given image data is thus approximately $N_\phi \times N_\omega \times N_x \times N(\phi,x)$. The yaw angle may have a first angular range (e.g., 30 degrees) and a first step size; the pitch angles may have a second angular range (e.g., 2 degrees) and a second step size. The search engine or alignment detector 18 may confine the search to a lateral search range covering the width of at least two rows. To increase the throughput of the data processor 12 or decrease the requisite processing resources, the first angular range and the second angular range may be decreased, or the step size may be increased with an accompanying loss of resolution or the field of view. Such decreases in the first angular range, the second angular range, and the step size may not be necessary if multi-processor configurations or multi-core processors are used for the data processor 12.

Figure 4:
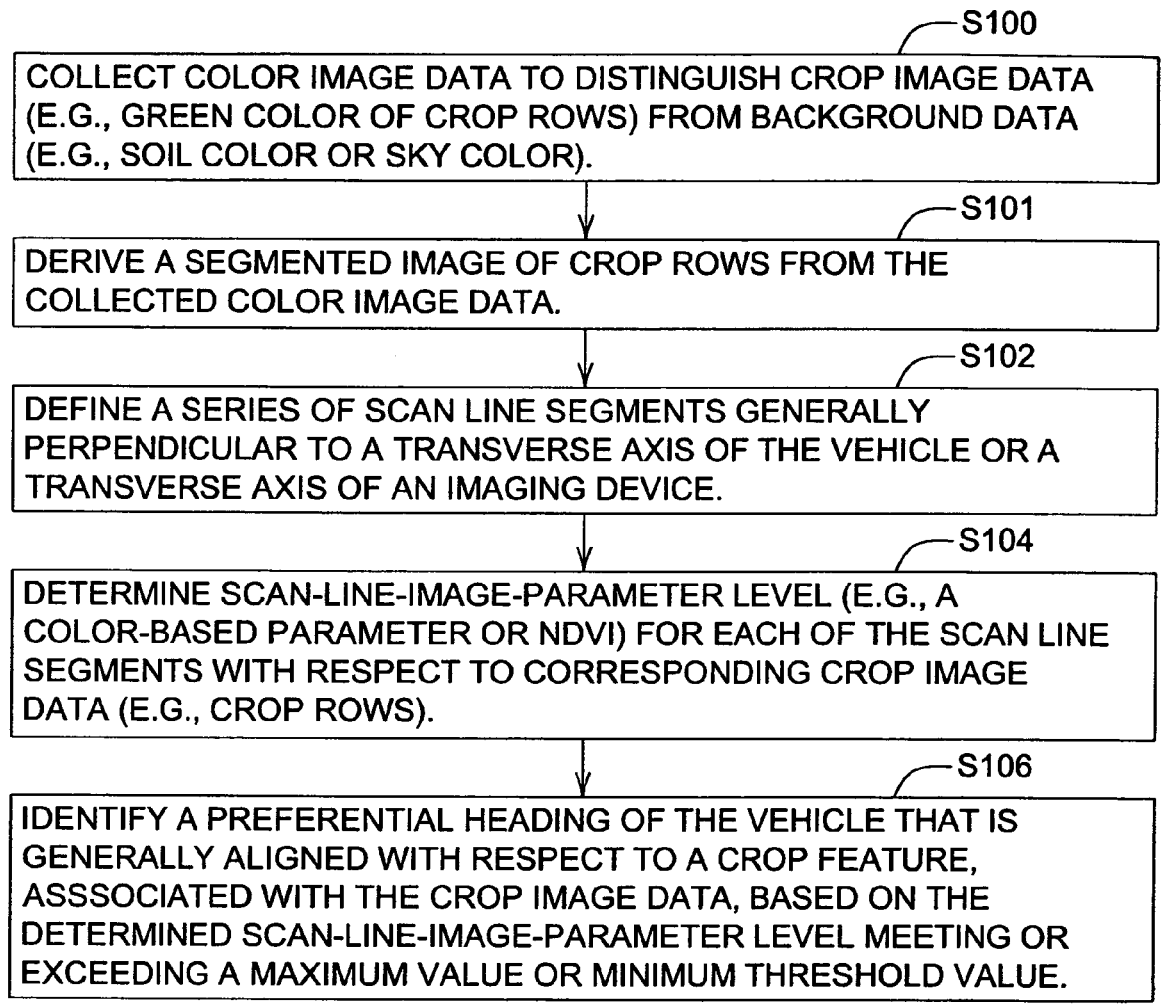
FIG. 4 is a flow chart of a second embodiment of a method for guiding a vehicle using a crop image data.

The method of FIG. 4 is similar to the method of FIG. 3 except the method of FIG. 4 adds step S101 after step S100. Like reference numbers in FIG. 3 and FIG. 4 indicate like steps or procedures.

In step S101, a data processor 12 or image segmenter 20 derives a segmented image of crop rows from the collected color image data. The image segmenter 20 may remove or filter information from the color collected image data to produce a grey-scale, mono-chrome, color or other segmented image data that excludes background data or all scene data outside of the crop rows or crop image data. In one example, the segmented image data may comprise a multi-state representation, a binary state representation (e.g., a plant pixel versus a non-plant pixel), or an array of pixels.

In an alternate embodiment or in accordance with the previous method of FIG. 1, step S101 may be omitted and a grey scale image may be used instead of the segmented image.

Figure 5:
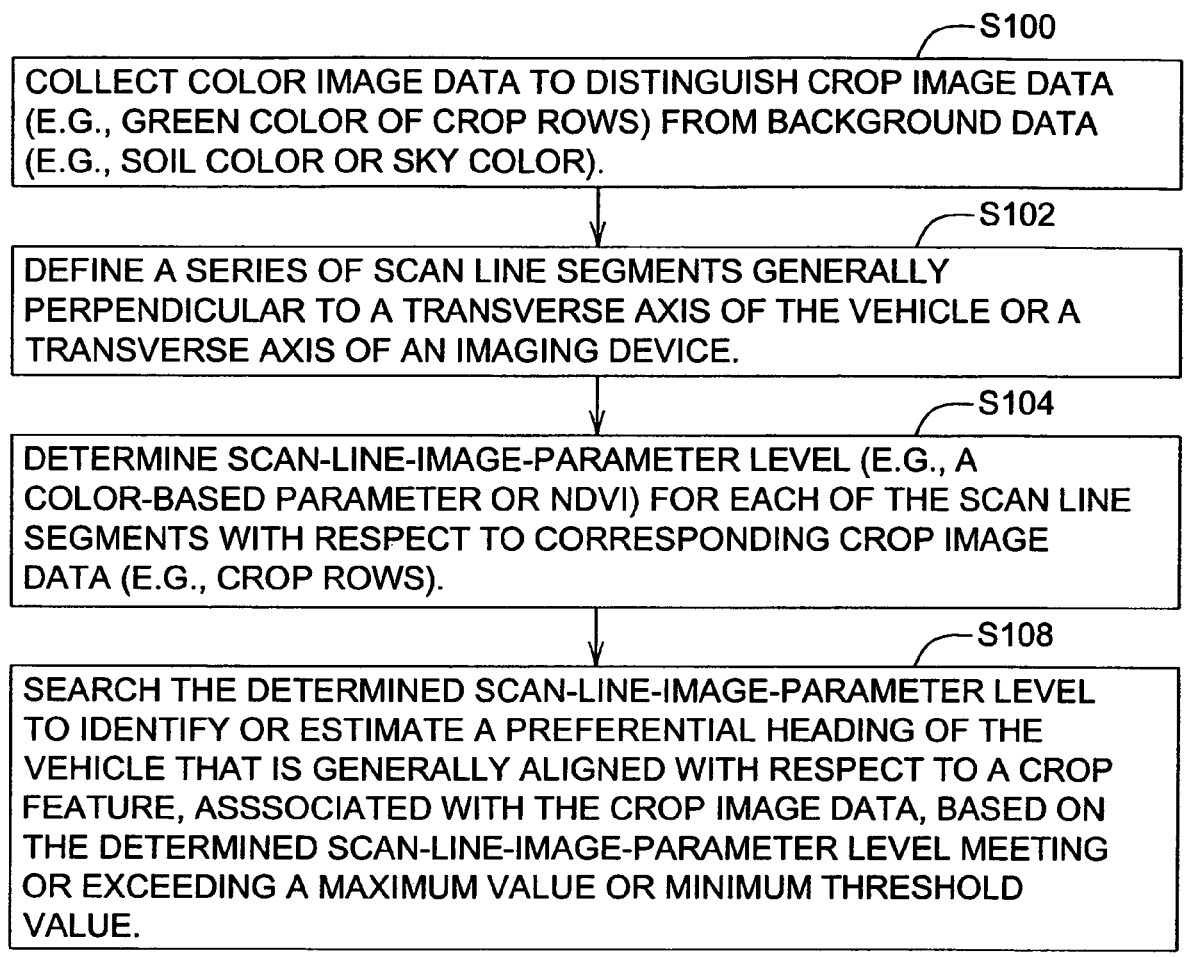
FIG. 5 is a flow chart of a third embodiment of a method for guiding a vehicle using a crop image data.

The method of FIG. 5 is similar to the method of FIG. 3, except the method of FIG. 5 replaces step S106 with step S108.

In step S108, an alignment detector 18 or a search engine searches the determined scan-line-image-parameter level (or other scan line image parameter data) to identify or estimate a preferential heading of the vehicle that is generally aligned with respect to a crop feature (e.g., a crop row), associated with the crop image data. The preferential heading is selected from candidate headings based on an evaluation of the determined scan line image parameter level (e.g., color-related parameter, saturation, hue value, green-red difference, plant color value or NDVI) (for corresponding candidate headings) meeting or exceeding maximum value (e.g., an NDVI in the range between 0.5 and 0.7) or minimum threshold value (e.g., an NDVI within a range between 0.1 and 0.3). The scan-line-image parameter refers the image parameter of a set of pixels or voxels associated with a scan line of a particular attitude or orientation. If the vehicle heading coincides with the crop row contour (e.g., a generally linear contour) and if the offset is minimal, the vehicle heading is generally aligned. Step S108 may be accomplished in accordance with various procedures, which may be applied independently or collectively.

Under a first procedure, the alignment detector 18 or search engine searches the determined scan line image parameter among corresponding candidate headings to identify a scan-line-image-parameter level (value or datum) that is greater than a minimum threshold scan-line-image-parameter level (value or datum). The alignment detector 18 or search engine may record a preferential attitude (or preferential attitude range) of the identified scan line or scan lines that are generally aligned with crop features (e.g., plant rows), consistent with the scan-line-image-parameter value meeting or exceeding the minimum threshold scan-line.

Under a second procedure, the alignment detector 18 or search engine searches the determined scan line image parameter values among corresponding candidate headings to identify a maximum value of a scan line image parameter level (values or data). The alignment detector 18 or search engine may record a preferential attitude (or preferential attitude range) of the identified scan line or scan lines that are generally aligned with crop features (e.g., plant rows), consistent with the scan-line-image-parameter value meeting or exceeding the maximum value of the scan line image parameter.

Under a third procedure, the alignment detector 18 or search engine searches the determined scan line image parameter to identify a maximum derivative or maximum change in the value of scan line image parameter data. The maximum derivative or maximum change in the level or value of scan line image parameter data may provide a general estimate of the corresponding maximum scan line image parameter. The maximum derivative or maximum change in the value of the scan line image parameter is generally locally associated with the maximum scan line image parameter. The alignment detector 18 or search engine may record a preferential attitude (or preferential attitude range) of the scan line or scan lines that are generally aligned with crop features (e.g., plant rows), consistent with the identified maximum derivative or maximum change.

Figure 6:
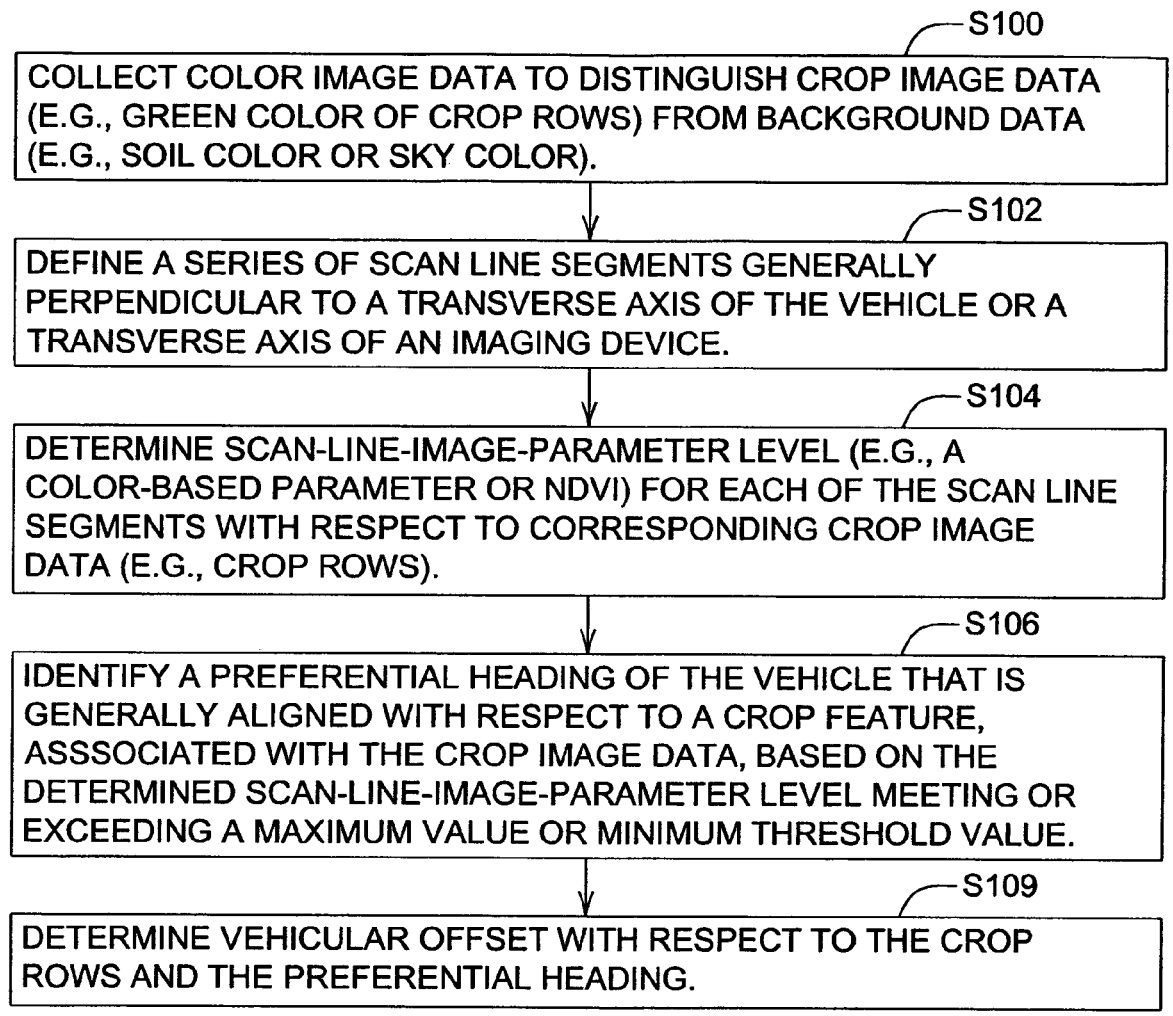
FIG. 6 is a flow chart of a fourth embodiment of a method for guiding a vehicle using a crop image data.

The method of FIG. 6 is similar to the method of FIG. 3, except the method of FIG. 6 adds step S109.

In step S109, the data processor 12 or offset calculator 21 determines the vehicle offset (e.g., steering error control signal) with respect to the crop rows and the preferential heading. After the preferential heading is found, the scan lines will follow or track alignment with the crop rows provided the crop rows are generally linear or straight and approximately equally spaced. The offset calculator 21 reduces or eliminates lateral offset of the vehicle with respect to the crop rows, among other things, such that the vehicle has a desired spatial orientation with respect to the crop rows. For example, a desired spatial orientation may mean the vehicle tire, wheels, or tracks are aligned to travel over designated traffic path areas between plant rows to avoid physical damage, stress or injury to adjacent plants.

Figure 7:
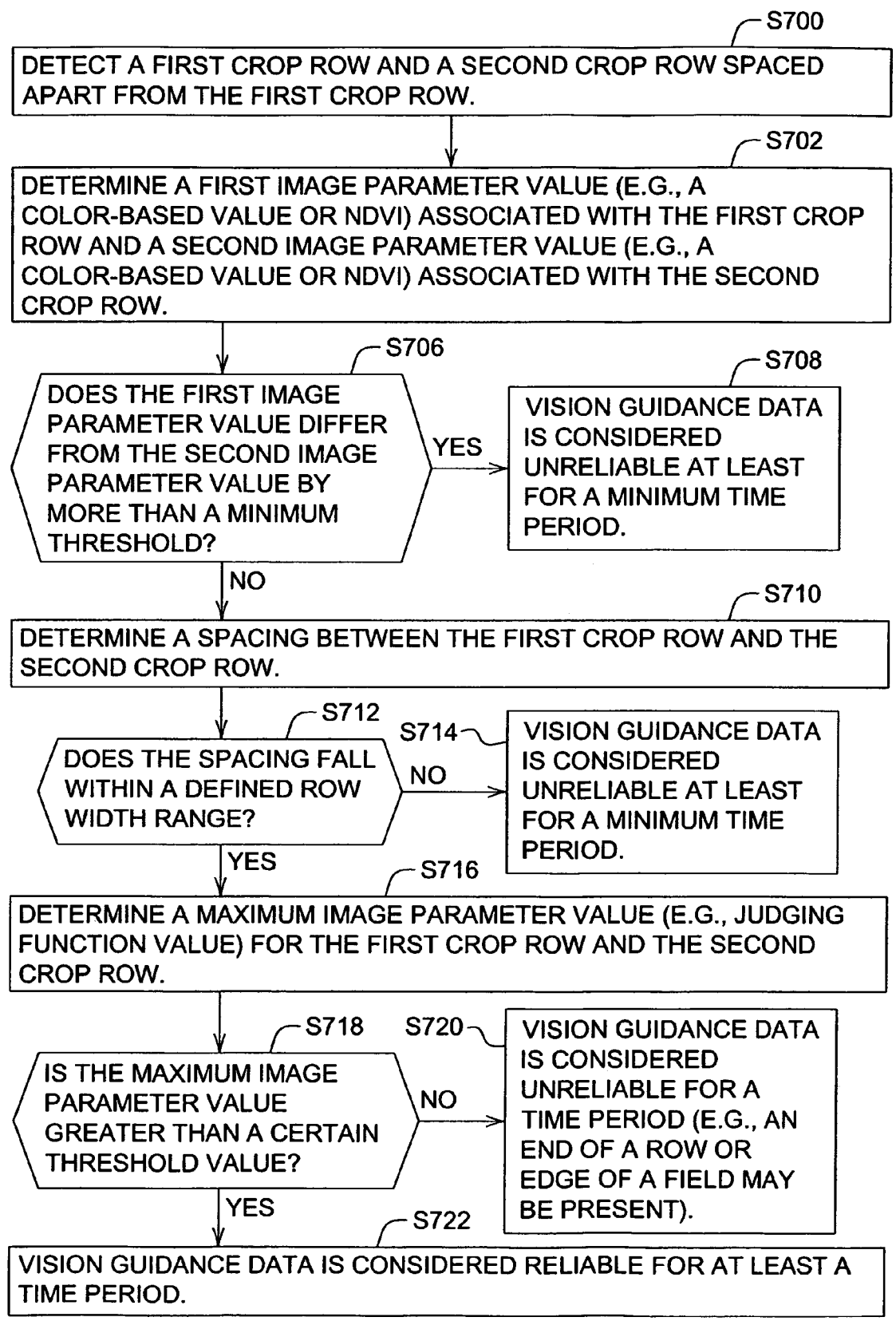
FIG. 7 is a flow chart of a first embodiment of a method for determining reliability of vision data for guiding a vehicle.

The method of FIG. 7 provides a procedure for determining whether the vision guidance data produced by the vision guidance system (11 or 111) is reliable. For example, the method of FIG. 7 may be applied to a vision guidance system or method disclosed herein to determine whether or not the preferential heading, and vehicle offset, or other control signals (derived from either or both) are sufficiently reliable.

In step S700, a data processor 12 or discriminator 19 detects a first crop row and a second crop row spaced apart from the first crop row. In one configuration, step S700 may be executed by following the following procedures or substeps, for example. First, the image data is collected for scene that includes the first crop row and the second crop row. Second, a filtered representation of the crop rows in the image is formed from the collected scene by color differentiation, hue differentiation, or another filtering technique. The pixels or voxels within the collected image that are representative of background information, as opposed to crop information may be rejected, screened out, or masked, whereas the pixels within the collected image that are representative of crop information are preserved, exposed, included, or identified by or in the filtered representation. Third, a pattern recognition scheme or other data processing scheme is used to identify or otherwise recognize the shapes of crop rows. For example, the filtered data is aligned with at least two generally linear masks (e.g., generally parallel linear masks) such that each generally linear mask intercepts, overlaps, or is otherwise aligned with (e.g., adjacently bordering or touching an edge of) crop rows within the filtered representation) the filtered data in the filtered representation. If required, the separation between the generally linear masks may be determined at one or more points as a proxy or estimate of the separation between the crop rows.

In step S702, the data processor 12 or image parameter evaluator 16 determines a first image parameter value associated with the first crop row and a second image parameter value associated with the second crop row.

In step S706, the data processor 12 or the image parameter evaluator 16 determines whether the first image parameter value (e.g., color-related parameter or NDVI) differs from the second image parameter value (e.g., a color related parameter or NDVI) by more than a minimum threshold. If the first image parameter value differs by the second image parameter value by more than a minimum threshold (e.g., 50% or 3 dB), then the method continues with step S708. However, if the first image parameter value does not differ from the second image parameter value by more than a minimum threshold (e.g., plants are a substantially similar shade of green), then the method continues with step S710.

In step S708, the data processor 12 may determine that the vision guidance data is considered unreliable at least for a time period. For example, the first crop row or the second crop row may be missing, damaged, discontinuous, wind-damaged, harvested, or otherwise, which causes the first image parameter to differ from the second image parameter by more than a minimum threshold.

In step S710, the data processor 12 may determine a spacing between the first crop row and the second crop row. For example, the data processor 12 may translate the image data coordinates into real world coordinates to determine the real world spacing between the first crop row and the second crop row. In one configuration, the data processor 12 determines the spacing or separation between the generally linear masks (described more fully in step S700) at one or more points as a proxy or estimate of the separation between the crop rows.

In step S712, a data processor 12 determines whether or not a spacing falls within a defined row width range. The spacing may also be referred to as the row spacing, row width, or crop width. The spacing is generally a constant value (e.g., typically 76 cm or 30 inches, for corn and soybeans) that depends upon the type of crop, the configuration or setting of the planting equipment, or both. If the spacing is not in the defined row range width (e.g., 51 to 102 cm, for corn and soybeans, which is equivalent to the range of 20 to 40 inches), the vision guidance data is considered unreliable for at least a minimum time period. If the spacing does not fall within a defined row range, the method continues with step S714. However, if the spacing falls within a defined row range, the method continues with step S716.

In step S714, the vision guidance data is considered unreliable for at least a time period.

In step S716, a data processor 12 or image parameter evaluator 16 determines or estimates a maximum image parameter value (e.g., a judging function value) for the first crop row and the second crop row. The judging function may comprise determining a maximum change or maximum derivative in the image parameter value to estimate or indicate the presence of the corresponding maximum image parameter value.

In step S718, a data processor 12 or image parameter evaluator 16 determines whether or not the maximum image parameter value is greater than a certain threshold value (e.g., a threshold value of NDVI or another color-related parameter that indicates a minimum degree or reliability of the vision guidance data). In one embodiment, the user may define the certain threshold value based upon studies, empirical tests, user preferences, where a desired degree of correlation exists between the reliability of the vision guidance data and the certain threshold value. If the maximum image parameter value is equal to or greater than a certain threshold value, the method may continue with step S722. However, if the maximum image parameter value is less than a certain threshold value, the method may continue with step S720.

In step S720, the data processor 12 determines that the vision guidance data is considered unreliable for at least a time period. The vision guidance data in step S720 may be considered unreliable for a number of reasons, including the visibility or definition of the crop rows in the image data. For example, the maximum image parameter may be less than a certain threshold value if rows are not visible or only a portion of the rows are visible, which might indicate the vehicle is approaching the end of a row or the edge of a field.

In step S722, the data processor 12 determines that the vision guidance data is reliable for at least a time period. Accordingly, the vision guidance system (11 or 111) may apply control information to the steering system 24 to attain and maintain the preferential heading in accordance with any procedures or methods previously discussed herein in FIG. 3 through FIG. 6. Further, the vision guidance may apply a vehicular offset.

Figure 8:
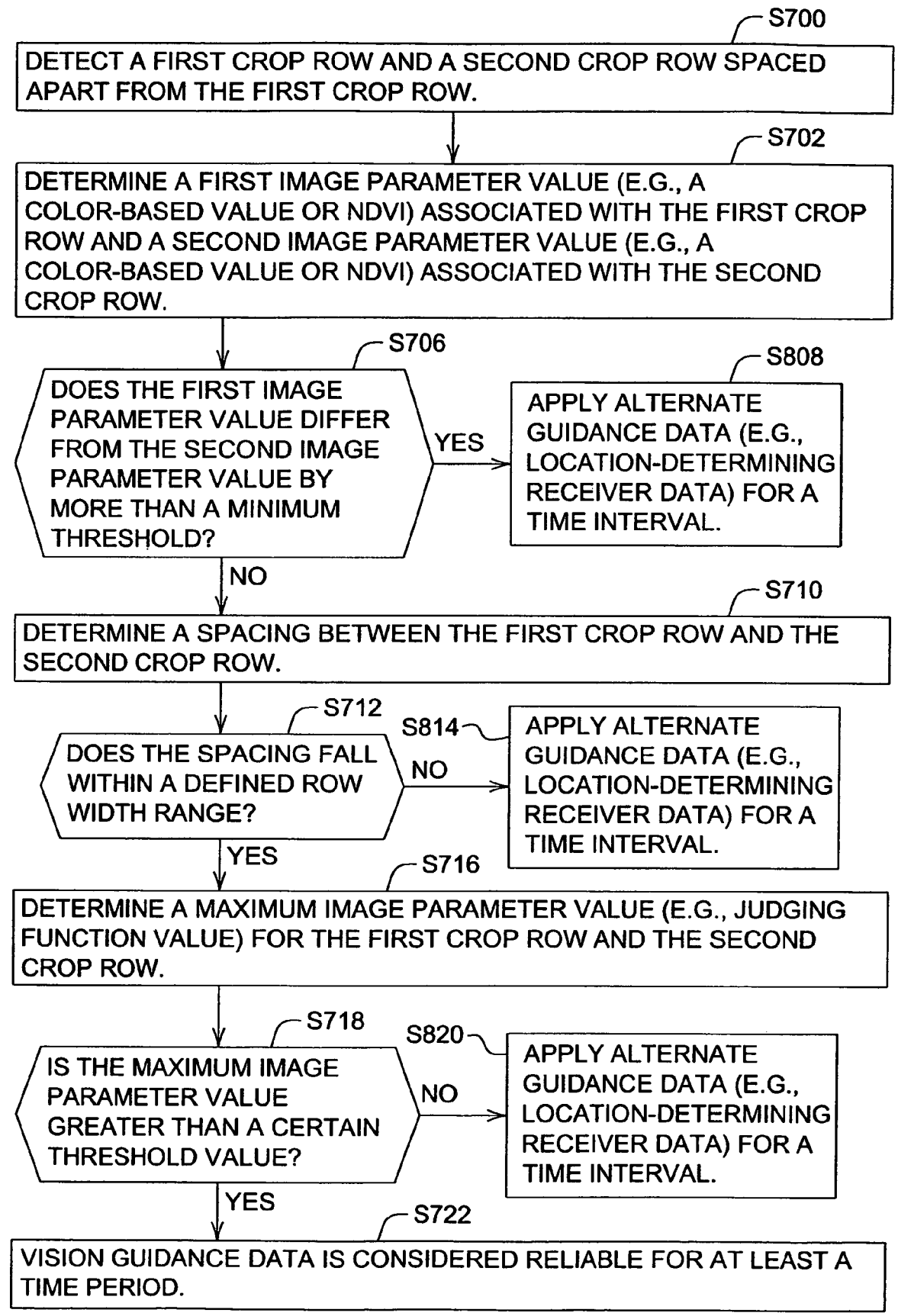
FIG. 8 is a flow chart of a second embodiment of a method for determining reliability of vision data for guiding a vehicle.

The method of FIG. 8 provides a procedure for determining whether the vision guidance data of the vision guidance system (11, 111 or 211 of FIG. 15) is reliable. For example, the method of FIG. 8 may be applied to any vision guidance system or any method disclosed herein to determine whether or not the preferential heading, and vehicle offset, or other control signals are sufficiently reliable. The method of FIG. 8 is similar to the method of FIG. 7, except FIG. 8 replaces step S708, S714, and S720 with steps S808, S814, and S820. Like steps or procedures in FIG. 7 and FIG. 8 share like reference numbers.

In step S700, a data processor 12 or discriminator 19 detects a first crop row and a second crop row spaced apart from the first crop row.

In step S702, the data processor 12 or image parameter evaluator 16 determines a first image parameter value associated with the first crop row and a second image parameter value associated with the second crop row.

In step S706, the data processor 12 or the image parameter evaluator 16 determines whether the first image parameter value differs from the second image parameter value by more than a minimum threshold. If the first image parameter value differs from the second image parameter value by more than a minimum threshold, then the method continues with step S808. However, if the first image parameter value does not differ from the second image parameter value by more than a minimum threshold, then the method continues with step S710.

In step S808, the data processor 12 may apply alternate guidance data for a time interval, as opposed to vision guidance data or other control data derived therefrom to attain or maintain a preferential heading of a vehicle. For instance, the data processor 12 may apply alternate guidance system from one or more of the following: a dead reckoning system, an odometer, a location-determining receiver (e.g., a location-determining receiver 33 in FIG. 15), a Global Positioning System receiver, a Global Positioning System receiver with differential correction, a local radio frequency positioning system, a range finder, a laser radar (e.g., ladar) system, and a radar system.

In step S710, the data processor 12 may determine a spacing between the first crop row and the second crop row. For example, the data processor 12 may translate the image data coordinates into real world coordinates to determine the real world spacing between the first crop row and the second crop row.

In step S712, a data processor 12 determines whether or not the spacing falls within a defined row width range. If the spacing does not fall within a defined row range, the method continues with step S814. However, if the spacing falls within a defined row range, the method continues with step S716.

In step S814, the data processor 12 may apply alternate guidance data for a time interval, as opposed to vision guidance data, or other control data derived therefrom, to attain or maintain a preferential heading. For instance, the data processor 12 may apply alternate guidance system from one or more of the following: a dead reckoning system, an odometer, a location-determining receiver (e.g., location determining receiver 33), a Global Positioning System receiver, a Global Positioning System receiver with differential correction, a local radio frequency positioning system, a range finder, a laser radar (e.g., ladar) system, and a radar system.

In step S716, a data processor 12 or image parameter evaluator 16 determines a maximum image parameter value (e.g., a judging function value) for the first crop row and the second crop row.

In step S718, a data processor 12 or image parameter evaluator 16 determines whether or not the maximum image parameter value is greater than a certain threshold value. In one embodiment, the user may define the certain threshold value based upon studies, empirical tests, user preferences, or otherwise. If the maximum image parameter value is equal to or greater than a certain threshold value, the method may continue with step S722. However, if the maximum image parameter value is less than a certain threshold value, the method may continue with step S820.

In step S820, the data processor 12 may apply alternate guidance data for a time period, as opposed to vision guidance data, or other control data derived therefrom, to attain or maintain a preferential heading. For instance, the data processor 12 may apply alternate guidance system from one or more of the following: a dead reckoning system, an odometer, a location-determining receiver (e.g., location-determining receiver 33 of FIG. 15), a Global Positioning System receiver, a Global Positioning System receiver with differential correction, a local radio frequency positioning system, a range finder, a laser radar (e.g., ladar) system, and a radar system.

In step S722, the data processor 12 determines that the vision guidance system is reliable for at least a time interval. Accordingly, the vision guidance system may apply control information to the steering system 24 to attain and maintain the preferential heading in accordance with any procedures or methods previously discussed herein. Further, the vision guidance system may apply a vehicular offset to place the vehicle on track in conformity with a desired course with respect to the first crop row and the second crop row, or other crop rows or reference markers.

The method of FIG. 9 provides a procedure for determining whether the vision guidance system (11, 111 or 211 of FIG. 15) is reliable. For example, the method of FIG. 9 may be applied to visional guidance system or method disclosed herein to determine whether or not the preferential heading, and vehicle offset, or other control signals are sufficiently reliable. The method of FIG. 9 is similar to the method of FIG.

7, except step S706 is replaced with step S906. Like reference numbers indicate like steps or procedures in FIG. 7 and FIG. 9.

In step S906, the data processor 12 determines whether the first image parameter level and the second image parameter level comply with an individual predetermined threshold, an aggregate predetermined threshold, or both. Step S906 may be carried out in accordance with various techniques that may be applied alternatively or cumulatively. Under a first technique for executing step S906, the data processor 12 determines whether the first image parameter level and the second image parameter level each are less than an individual predetermined threshold. If the first image parameter level and the second image parameter level are each less than the individual predetermined threshold, then the first image parameter level and the second image parameter level are noncompliant and method continues with step S708. However, if the first image parameter level, the second image parameter level, or both are greater than or equal to an individual predetermined threshold, then the method continues with step S710.

Under a second technique for executing step S906, the data processor 12 determines whether the first image parameter level and the second image parameter level are cumulatively less than an aggregate predetermined threshold. If the first image parameter level and the second image parameter level are cumulatively less than the individual aggregate threshold, the first image parameter level and the second image parameter level are noncompliant and method continues with step S708. However, if the first image parameter level and the second image parameter level are collectively greater than or equal to an aggregate predetermined threshold, then the first image parameter level and the second image parameter level are compliant and the method continues with step S710.

Accordingly, the methods of FIG. 7 through FIG. 9 support evaluating and establishing the reliability of guidance parameters to address such the application of vision in the context of the end of crop rows, when one or both of the crop rows are not straight, or when there are too many missing plants to determine reliable vision guidance data.

Figure 10A:
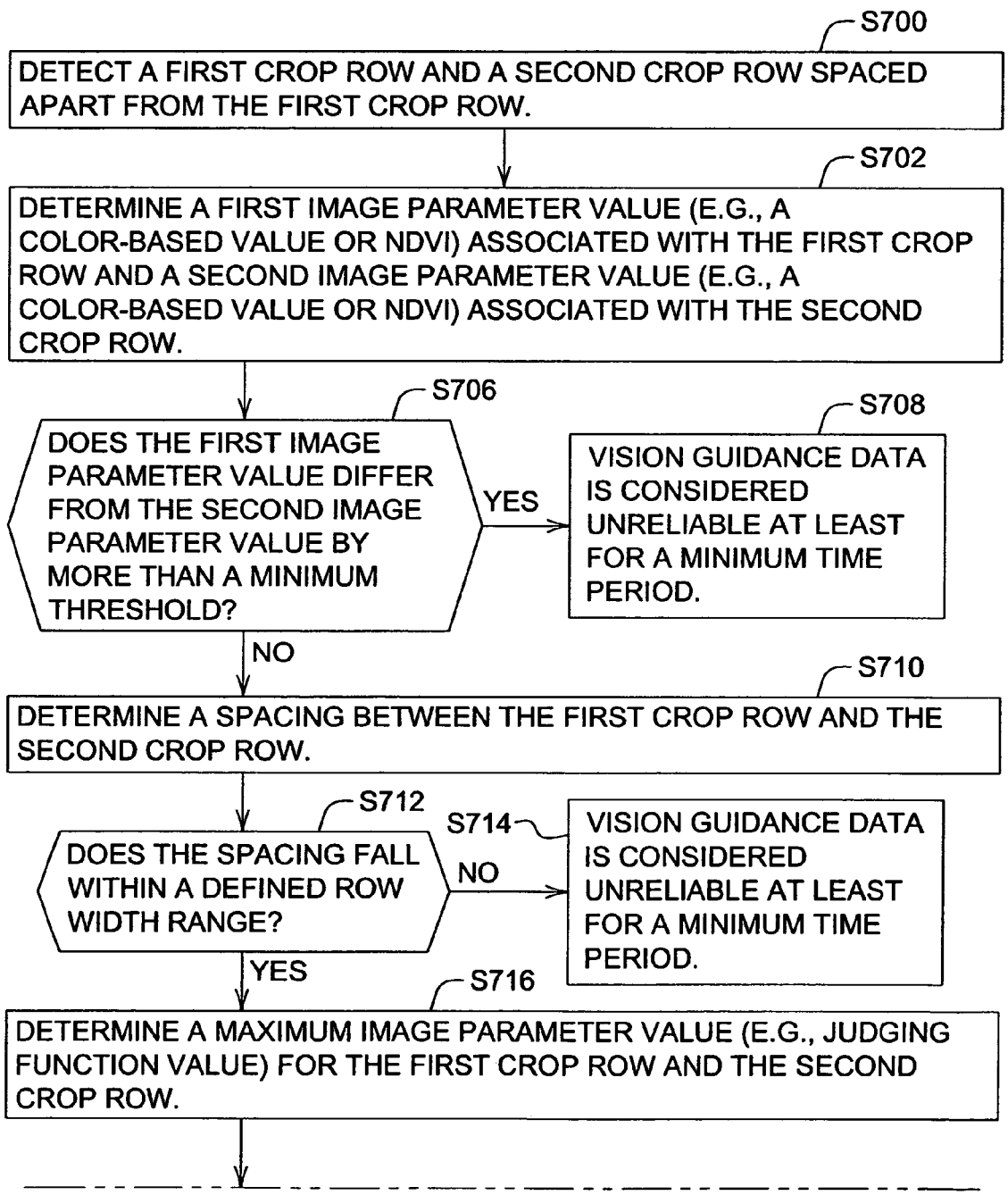
FIG. 10A and FIG. 10B are a flow chart of a fourth embodiment of a method for determining reliability of vision data for guiding a vehicle.
Figure 10B:
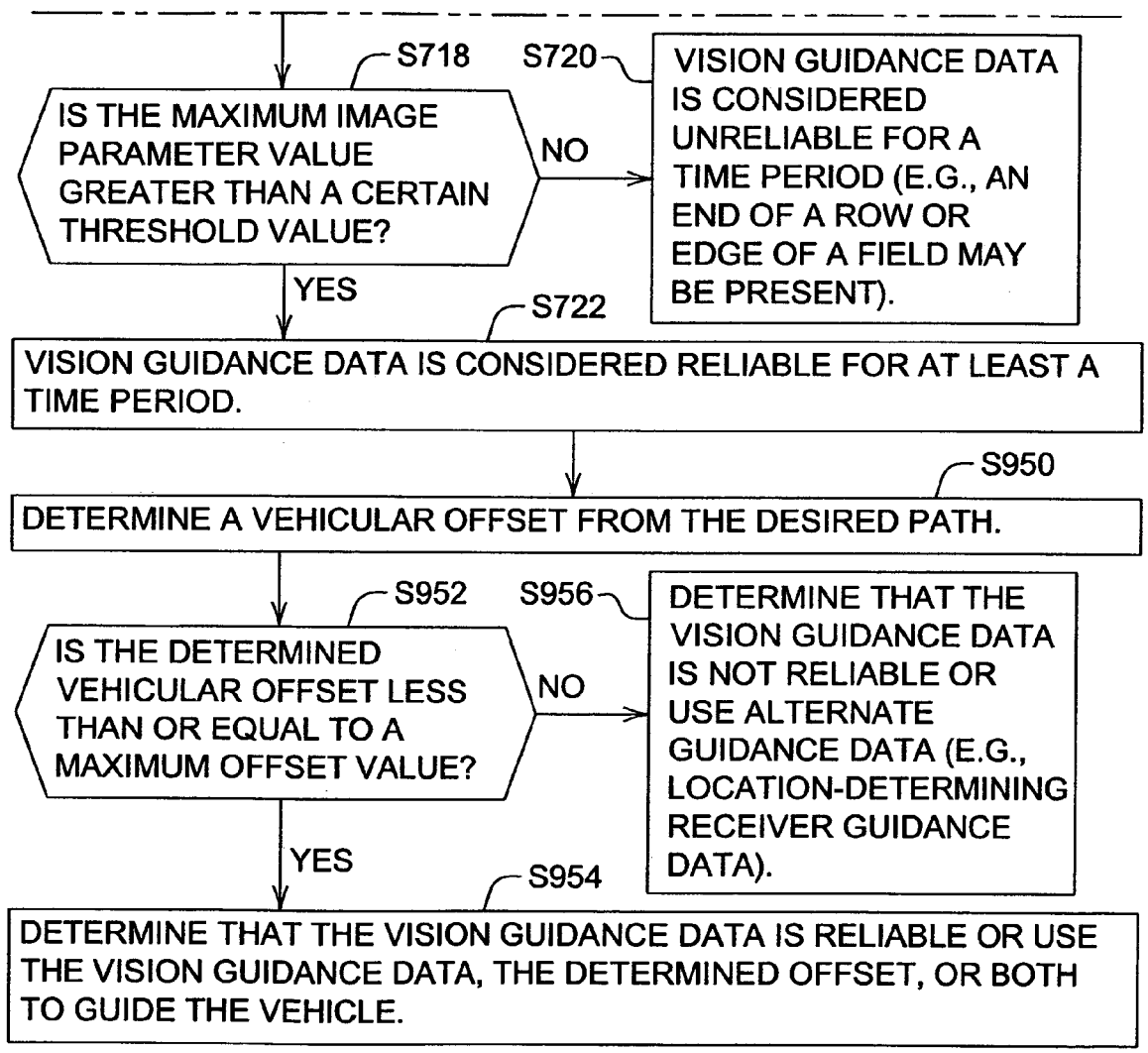

The method of FIG. 10A and FIG. 10B is similar to the method of FIG. 7, except the method of FIG. 10A and FIG. 10B includes additional steps S950, S952, and S954. Like reference numbers in FIG. 7 and FIG. 10A and FIG. 10B indicate like elements.

In step S950, the vehicular offset from the desired path is determined after step S722 or simultaneously therewith.

In step S952, the data processor 12 determines whether the determined offset is less than or equal to a maximum offset value. For example, for illustrative purposes the maximum offset value may be set to one-half of the row spacing between adjacent crop rows. If the maximum offset is less than or equal to the maximum offset value, the method continues with step S954. However, if the maximum offset is greater than the maximum offset value, the method continues with step S956.

In step S954, the data processor 12 determines that the vision guidance data is reliable or uses the vision guidance data to guide the vehicle. For instance, the data processor 12 may use vision guidance data, the determined offset of step S950, or both to guide the vehicle in accordance with any embodiment previously disclosed herein.

In step S956, the data processor 12 determines that the vision guidance data is not reliable or alternative guidance data is used. The alternative guidance data may comprise location data (e.g., coordinates) from a location-determining receiver (e.g., Global Positioning System (GPS) receiver with differential correction), a dead-reckoning system, an odometer, or from any other device that generates position data.

FIG. 11A provides an illustrative example of the collected color image data that the imaging device 10 may gather. The imaging device 10 may gather a group of color image data at regular intervals (e.g., periodically). The sampling rate or interval period may depend upon the velocity or speed of the vehicle or may be set to a maximum velocity of the vehicle. The greater the vehicle speed or velocity, the greater the sampling rate and less the interval period.

FIG. 11B shows an illustrative example of a segmented image that is derived from the output of the discriminator 19 or the collected color image of FIG. 11A. The discriminator 19 or data processor 12 may be used to identify the crop rows or other crop feature in the image data by color discrimination, for example. The image segmenter 20 or data processor 12 may filter out the background image data or image data other than the crop features to yield the segmented image or a filtered representation of the crop rows.

Figure 12A:
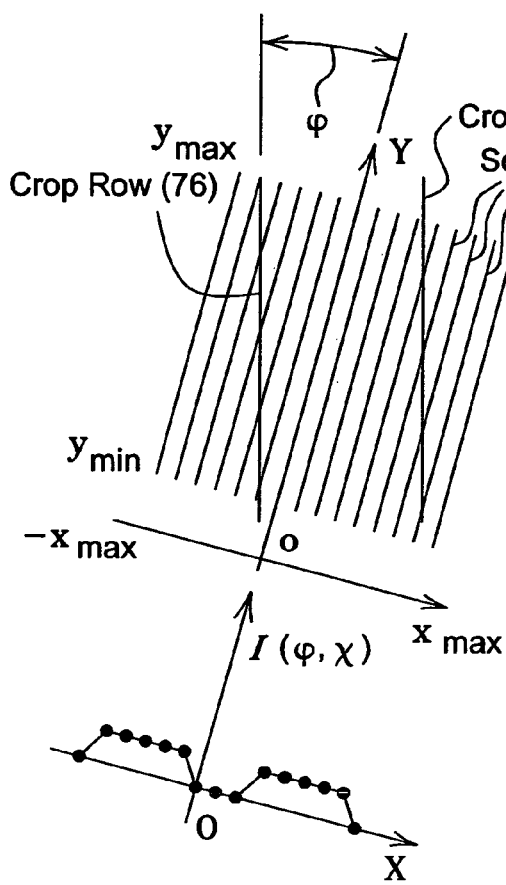
FIG. 12A shows a first orientation of the scan lines with respect to crop rows, where the scan lines extend generally perpendicularly from a reference axis (e.g., x axis) associated with the system for vehicular guidance.
Figure 12B:
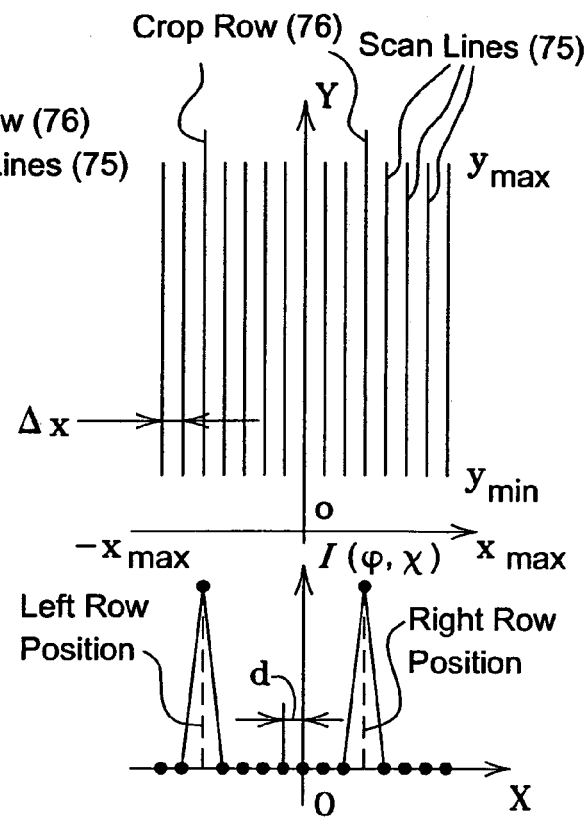
FIG. 12B shows a second orientation of the scan lines with respect to crop rows.
Figure 12C:
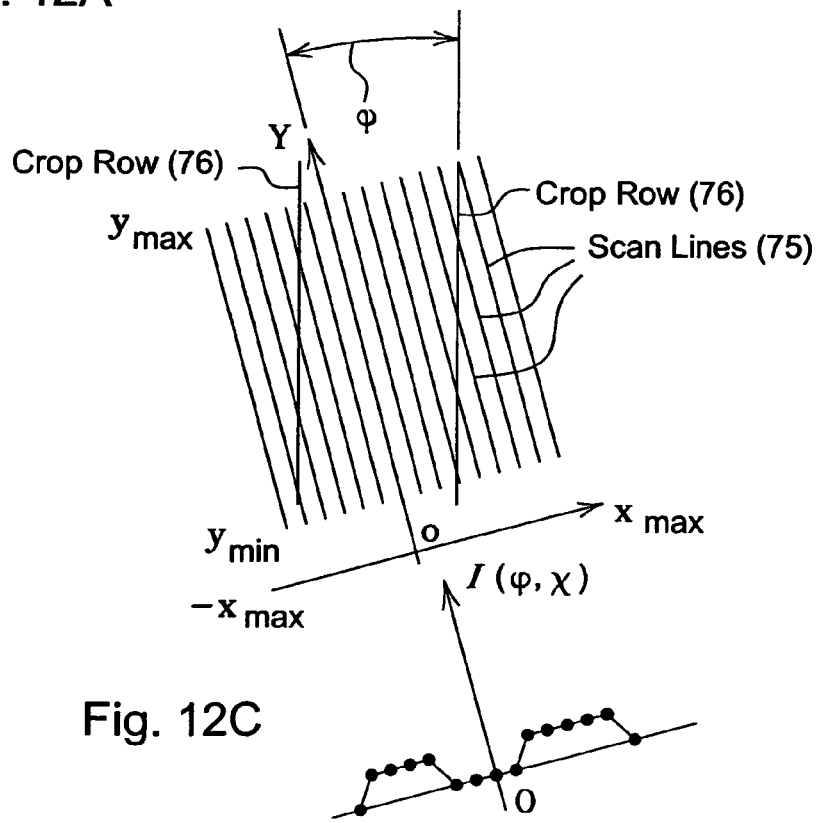
FIG. 12C shows a third orientation of the scan lines with respect to crop rows.

In FIG. 12A through FIG. 12C, inclusive, illustrate the relationship of the orientation of scan lines 75 to crop rows 76 attendant and scan line image parameter variation. FIG. 12A through FIG. 12C describe how scan line image parameter data may be searched to identify or estimate a maximum value of scan line image parameter associated with an aligned state of the vehicle to the crop image data (e.g., crop rows). The techniques for searching the scan lines and associated equations may be applied to identify or estimate an aligned state of the vehicle to the crop image in accordance with any method disclosed herein. For example, the techniques described in conjunction with FIG. 12A through FIG. 12C may be applied to step S108 of FIG. 5, among other steps and embodiments of methods disclosed herein.

In FIG. 12A through FIG. 12C, inclusive, the direction of forward travel of the vehicle is designated the Y axis and the lateral direction is designated the X axis. The field of view (FOV) of the imaging device 10 (e.g., or its lens) limits the candidate heading(s) (and candidate vehicle offset) with respect to crop rows to certain range. As shown in FIG. 12A through FIG. 12C, the vehicle's possible heading angle ($\phi$), which is also known as the yaw angle, may range from $-\phi_{max}$ to $\phi_{max}$. The lateral view along the X axis ranges from $-x_{max}$ (leftmost) to $x_{max}$ (rightmost).

In one embodiment, the search algorithm or alignment detector 18 equally divides the range of yaw angles to $N_\phi$ small steps, with a step angle of $\Delta\phi$. Accordingly, $$N_\phi \times \Delta\phi = 2\phi_{max}$$

Further, the search algorithm or alignment detector 18 may equally divide the lateral range of $(-x_{max}, x_{max})$ into $N_x$ steps with a step length of $\Delta x$, then, $$N_x \times \Delta x = 2x_{max}$$

Although the scan lines may be configured in other ways, here the imaging device 10 or data processor 12 defines a series of scan lines that are generally parallel to the Y-axis at each step $\Delta x$. $\Delta x$ is generally chosen to be small enough to ensure a desired resolution of quantity of pixels in the search space are covered by scan lines. As illustrated, the scan lines may range from $y_{min}$ to $y_{max}$ in the Y direction. The generally rectangular area formed by $(-x_{max}$ to $x_{max})$ and $(y_{min}$ to $y_{max})$ may represent the search space for searching a preferential heading among candidate headings of the vehicle. The X range is generally chosen to be approximately two times of the row width so two crop rows are covered by the scan lines.

The scan lines in FIG. 12A and FIG. 12C illustrate scenarios where the scan lines are not generally parallel to the crop rows. Instead, the scan lines 75 form an arbitrary heading angle $\phi$ with the crop rows 76. However, if the scan lines together with the coordinate system are rotated from $-\phi_{max}$ to $\phi_{max}$ over one or more steps $\Delta\phi$, there will be a preferential heading when the vehicle heading and scan lines are parallel to crop rows, such as that illustrated in FIG. 12B. The average pixel image parameter, I($\phi$,x), on the scan line at lateral position x with rotation angle $\phi$, is calculated as:

$$I(\varphi, x) = \frac{1}{N(\varphi, x)} \sum_{y=y_{min}}^{y_{max}} P(x, y),$$

where N($\phi$, x) is the number of pixels on the scan line x and P(x,y) is the pixel's image parameter value at coordinate (x,y). N($\phi$,x) may be different at different rotation angles and different lateral positions. The image parameter variation (derivative) of I($\phi$, x) among the scan lines is defined as a judging function, $\sigma(\phi)$, to search for the preferential heading angle among candidate heading angles:

$$\sigma(\varphi) = \frac{1}{N_x} \sum_{x=-x_{max}}^{x_{max}-1} |I(\varphi, x) - (\varphi, x+1)|$$

where $N_x$ is the number of scan lines.

After image segmentation, the crop image pixels may be set to a first value (e.g., one) and background image pixels may be set to a second value (e.g., zero) distinct from the first value. In FIGS. 12A, 12B, and 12C, some scan lines 75 intersect with crop rows 76 and some do not. The image parameter level or I($\phi$, x) on an un-intersected scan line is zero. The image parameter level or I($\phi$, x) on an intersected scan line is non-zero. Image parameter varies in the transition from an intersected line to an un-intersected line and from an un-intersected line to an intersected line.

In FIG. 12A, the vehicle heading or candidate heading is turned to the right of alignment with the crop rows, whereas in FIG. 12B the vehicle heading or candidate heading is turned to the left of alignment with the crop rows. In FIG. 12 A, the vehicle heading is turned to the right and each crop row is associated with a relatively large number of scan lines. Accordingly, the image parameter variation $\sigma(\phi)$ is somewhat uniformly distributed or generally low, as indicated by the image parameter (I) versus X position plot associated with FIG. 12A.

In FIG. 12C, the candidate heading is turned to the left and each crop row is associated with a relatively large number of scan lines. Accordingly, the image parameter variation $\sigma(\phi)$, is somewhat uniformly distributed or generally low, as indicated by the image parameter (I) versus X position plot associated with FIG. 12C. Non-zero pixels in crop rows are evenly distributed in relatively large number of scan lines in FIG. 12A and FIG. 12C, so the image parameter along a single scan line will be smaller than that of a reference scan line aligned with the crop row.

If the vehicle preferential heading is parallel to the crop rows as in FIG. 12B, the non-zero pixels in crop rows are overlaid in a very few scan lines and the I($\phi$,x) on the few or several aligned scan lines will be larger. For the same number of image parameter transitions from zero to nonzero and from nonzero to zero, the image parameter variations in X direction, $\sigma(\phi)$, will reach maximum when the vehicle heading is parallel to the crop rows. Therefore, $\sigma(\phi)$ can be used as a judging function to search the candidate heading angles to identify a preferential heading angle. The preferential heading angle is the rotation angle, $\phi_1$, when $\sigma(\phi)$ reaches its maximum.

In FIG. 12B, after the vehicle heading is found, the scan lines will follow crop rows. The peak position of I($\phi$, x) between 0 and $N_x/2$ will give the position of the left crop row and the peak position between $N_x/2$ and $N_x$ will be the right crop position. The distance between the center of scan lines and center of the left and right crop rows is the vehicle offset (d). The distance between the left and right crop rows is the calculated between-row spacing (width).

Figure 13A:
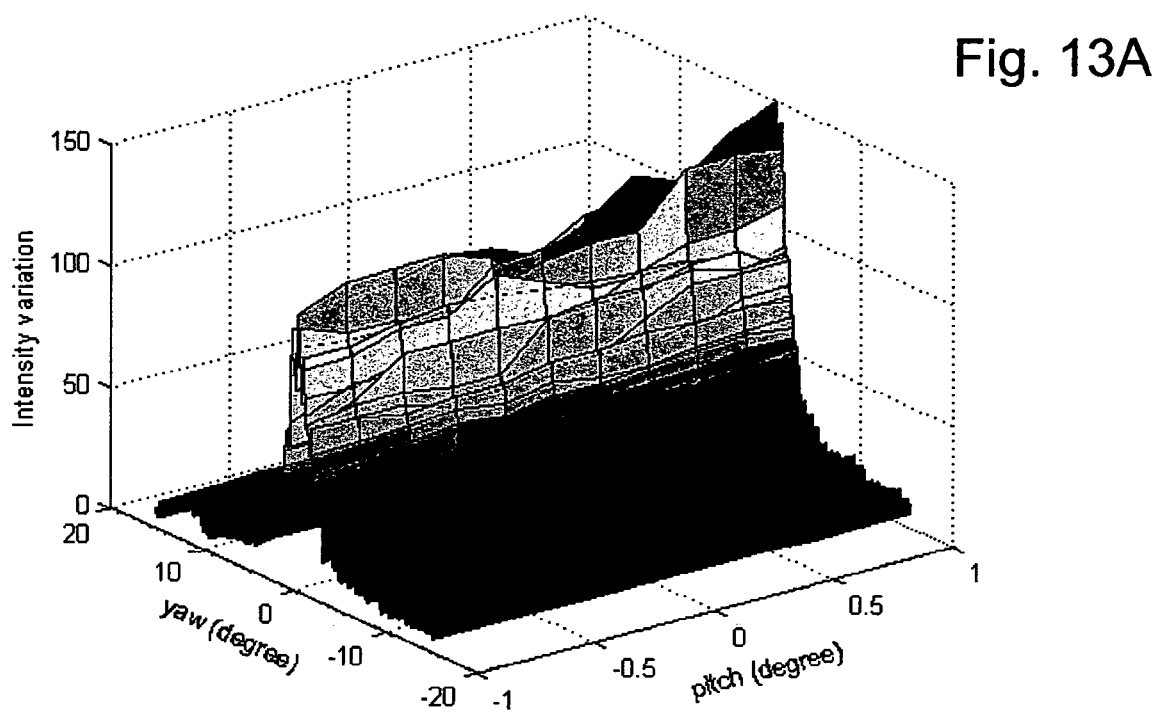
FIG. 13A is a three dimensional representation of image parameter variation associated with an image of a crop row.
Figure 13B:
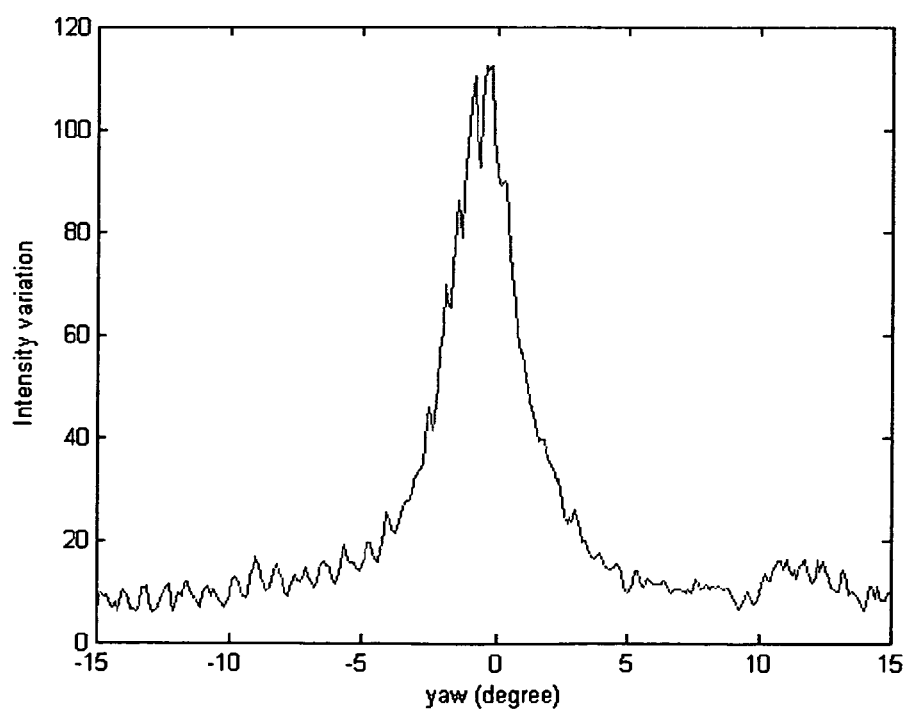
FIG. 13B shows an average image parameter variation versus yaw, which represents a profile of the three dimensional representation of FIG. 13A.

In field conditions, the vehicle vibration may cause imaging device's pitch angle to change. To compensate for vehicle vibration, the judging function, $\sigma(\phi)$ may be modeled as $\sigma(\phi,\omega)$ to include the pitch angle $\omega$ an additional variable. In addition, crop row boundaries are uneven and may have noise in the image, and consequently, $\sigma(\phi, \omega)$ may be noisy too. An example three dimensional plot of $\sigma(\phi, \omega)$ vs $\phi$ and $\omega$ is shown in FIG. 13A. Since the pitch angle is not a guidance parameter, it is averaged from $-\omega_{max}$ to $\omega_{max}$ to smooth the judging function:

$$\sigma(\varphi) = \frac{1}{N_\omega} \sum_{\omega=-\omega_{max}}^{\omega_{max}} \sigma(\varphi, \omega),$$

where $N_\omega$ is the number of pitch angles to be averaged. FIG. 13B shows the judging function after pitch averaging. Furthermore, a moving average of $N'_\phi$ points is conducted over $\phi$ to further smooth the judging function:

$$\sigma'(\varphi) = \frac{1}{N'_\varphi} \sum_{\varphi=-\varphi_{max}+N'_\varphi/2}^{\varphi_{max}-N'_\varphi/2} \sigma(\varphi)$$

Figure 13C:
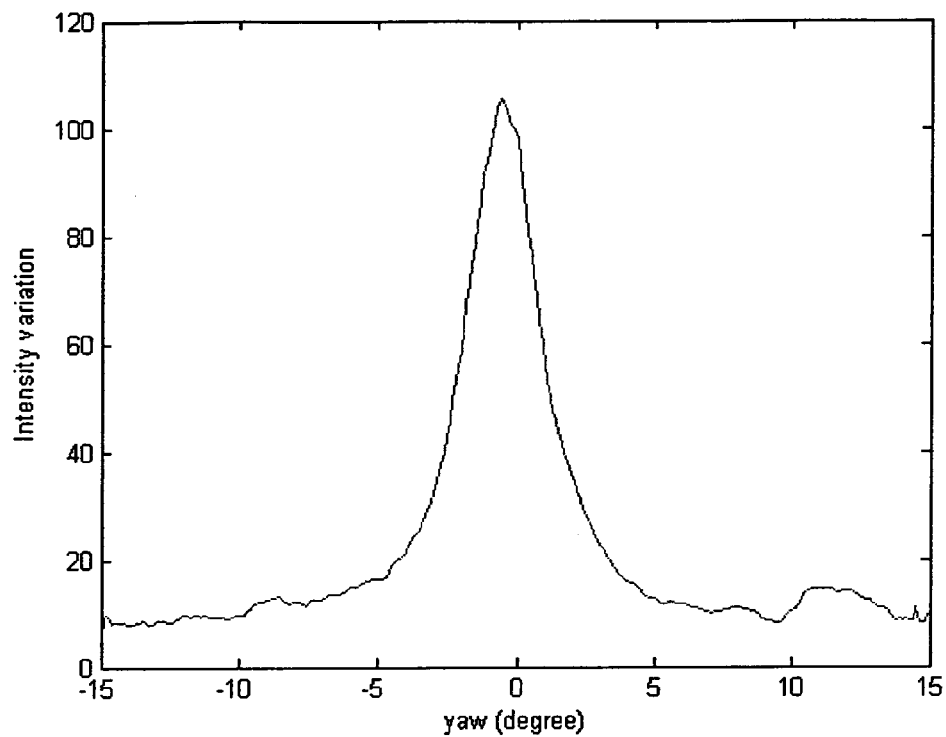
FIG. 13C shows another average image parameter variation versus yaw, which represents a profile of the three dimensional representation of FIG. 13A.

FIG. 13C shows the image parameter variation after the moving averaging operation.

Figure 13D:
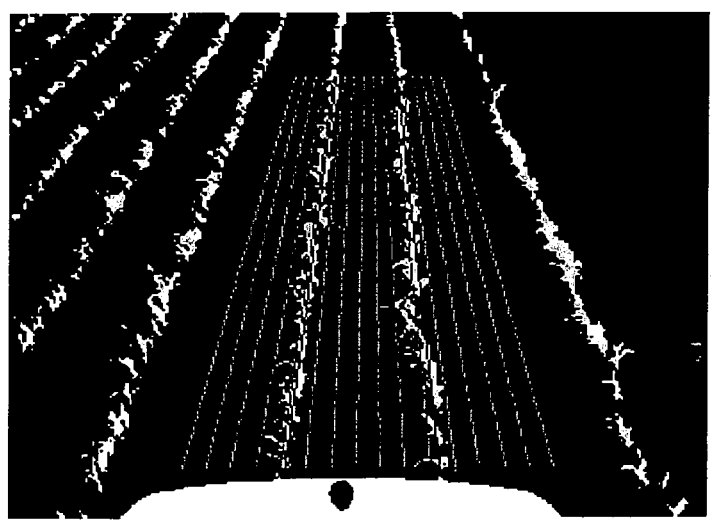
FIG. 13D shows scan lines overlaid on a segmented image with row position.

FIG. 13D shows a graphical representation of the vehicle preferential heading found after searching candidate headings. For the preferential heading, an aligned pair of the scan lines are generally overlaid onto row positions of the segmented image.

Figure 14:
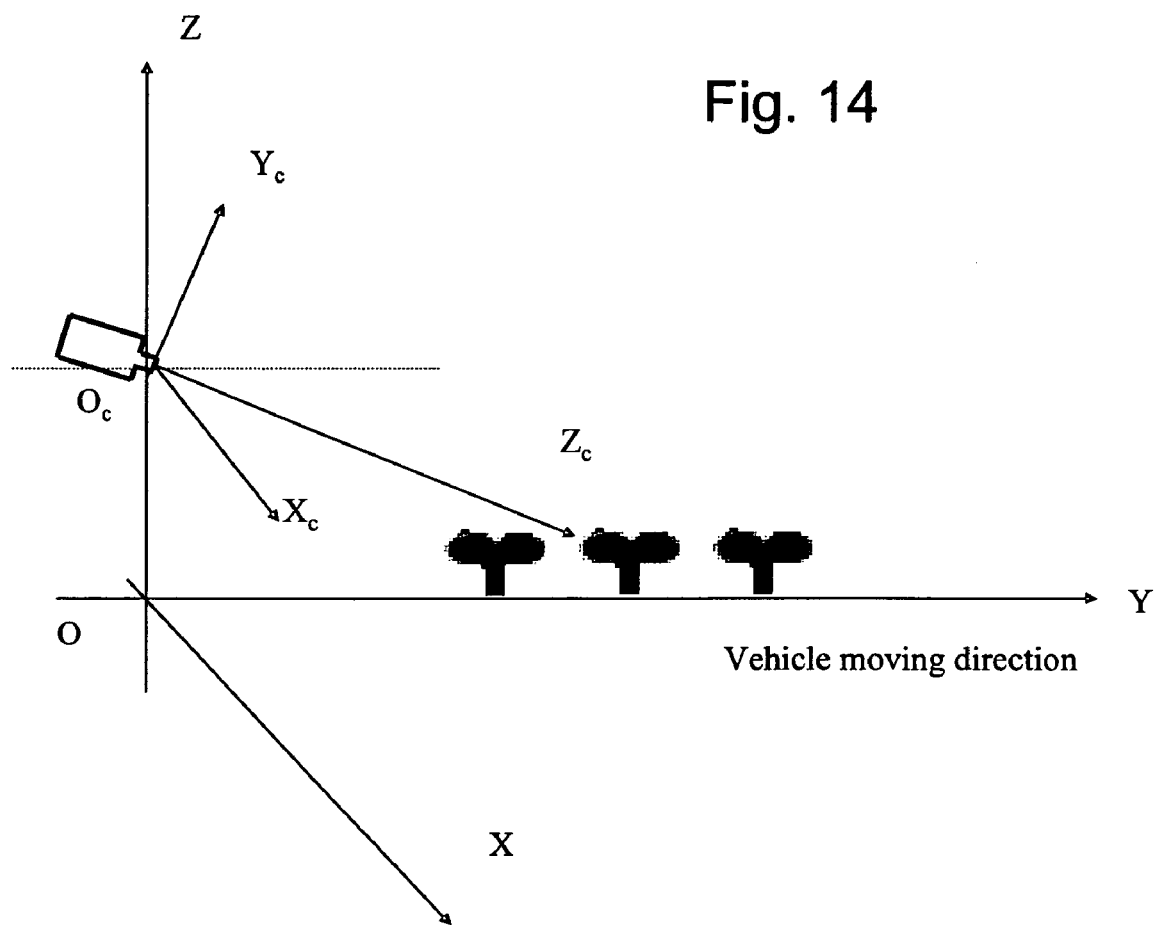
FIG. 14 shows a diagram that illustrates the relationship between the camera coordinate system and the real world coordinate system.

As shown in FIG. 14, the world coordinate system may be defined with respect to the vehicle coordinate system. In the vehicle coordinate system, the vehicle forward direction is regarded as the Y direction, the vehicle lateral direction is designated X, and vertical direction is designated Z. X is also referred to as the transverse axis of the vehicle. The vehicle coordinates in FIG. 14 are the equivalent of (XY plane) world coordinates.

The imaging coordinate system (e.g., $X_c Y_c Z_c$ in FIG. 14) is an imaging device centered coordinate system. The $X_c$-axis defines an axis that extends laterally (e.g., linearly from a left-to-right direction); the $Y_c$-axis defines an axis that extends upward (e.g., linearly from a low-to-high direction); and the $Z_c$-axis follows the optical or physical centerline of a lens of the imaging device 10. The $X_c$-axis is also referred to as the transverse axis of the imaging device or imaging system. World coordinate and imaging coordinate systems both belong to world space. However, an when an object is projected into the imaging device 10, the formed two dimensional image data lies in the image space, as opposed to world space.

The imaging device 10, the definer 14, or the data processor 12 may calibrate the image data to transform a point's coordinates in world space to its corresponding pixel's coordinates in image space (e.g., image plane). Calibration of the imaging device 10 includes extrinsic parameters and intrinsic parameters. Extrinsic parameters define how to transform an object from world coordinates to imaging coordinates in world space. Extrinsic parameters include the camera's three dimensional coordinates in the world coordinate system and its pitch, roll, and yaw angles. Once the installation of the imaging device 10 is fixed, extrinsic parameters do not need to change. Intrinsic parameters define how to transform an object from world space to image space. The intrinsic parameters include the camera's focus length, its image center in the image plane, and related distortion coefficients. The intrinsic parameters are fixed for a given imaging device 10 and lens. Various algorithms may be employed to map a point from the world space to a point in the two dimensional image plane, or vice versa.

In any of the embodiments or methods disclosed herein, the heading search may be conducted in world space or in image space. For each combination of (yaw, pitch), a mapping table between all the points in the scan lines in world space and their corresponding pixel coordinates in image space (e.g. image plane) is established in the algorithm's initialization phase. The points in scan lines that are outside of image window will be truncated and marked as not available in the mapping table. After the mapping is done, it is straightforward to calculate the image parameter along a certain scan line or scan lines by finding the value of the pixels lying on it. If the guidance parameters are calculated in the image space first, then those guidance parameters are transformed into the world space.

Figure 15:
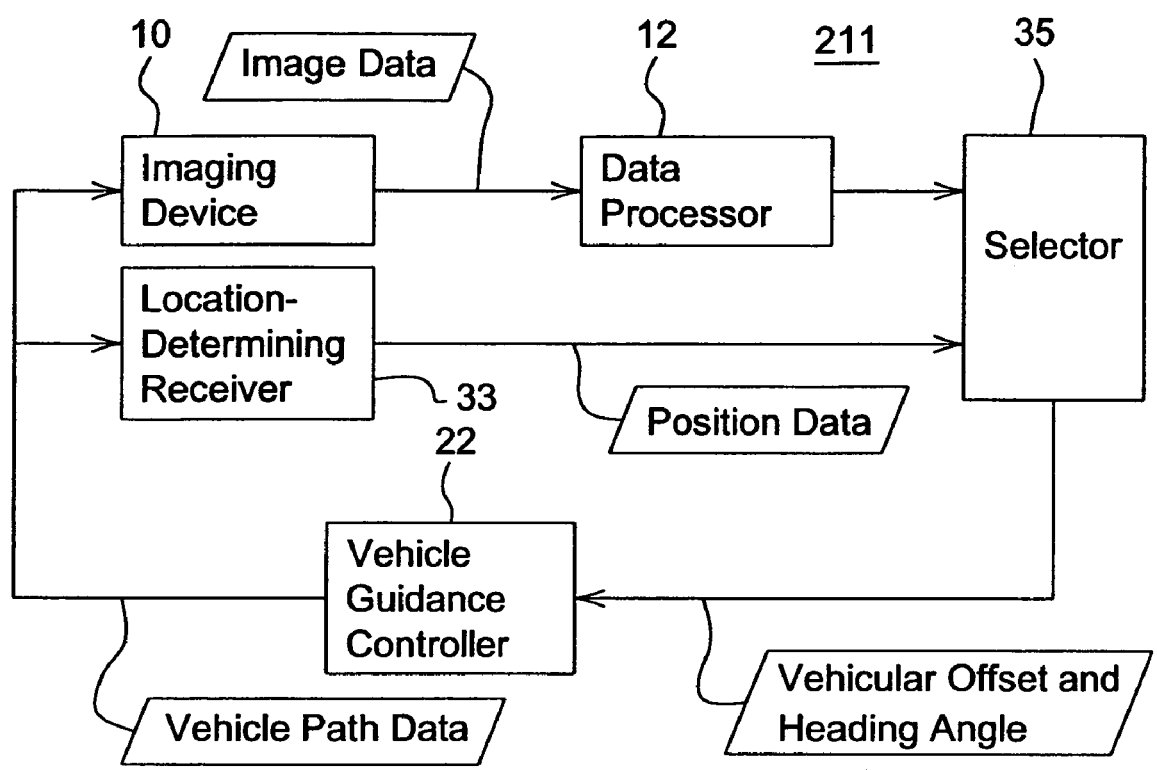
FIG. 15 is a block diagram of yet another embodiment of a system for vehicular guidance.

The guidance system 211 of FIG. 15 is similar to the vision guidance system 11 of FIG. 1 or the vision guidance system of FIG. 2, except the guidance system of FIG. 15 further includes location-determining receiver 33 and a selector 35. Like reference numbers in FIG. 1, FIG. 2 and FIG. 15 indicate like elements.

The location determining receiver 33 may comprise a Global Positioning System (GPS) receiver with or without differential correction. The location-determining receiver 33 provides an alternate guidance data or position data when the imaging device 10 and data processor 12 produce generally unreliable data during a time period (e.g., an interval). In contrast, if the location-determining receiver 33 fails or is unreliable because of satellite dropouts or unreliable communication between the vehicle and a base station that transmits differential correction information (e.g., operating in the RTK mode), the imaging device 10 may provide reliable guidance information, subject to the determination of the reliability estimator 23.

The selector 35 may use the reliability estimator 23 to determine whether to apply image data from the imaging device 10 or position data from the location-determining receiver 33 to guide the vehicle in accordance with a vehicular offset and preferential heading angle. Once the vehicle is moved in accordance with the vehicular offset and preferential heading angle, the captured image data reflect the new vehicle position with respect to crop rows. Thus, the guidance system 211 may be operated as a closed-loop control system in which vehicle path data provides feedback or other reference information to the imaging device 10 and the location determining receiver 33.

Having described the preferred embodiment, it will become apparent that various modifications can be made without departing from the scope of the invention as defined in the accompanying claims.

The invention claimed is:

1. A method of guiding a vehicle, the method comprising:
   collecting color image data;
   defining a series of scan line segments generally perpendicular to a transverse axis of the vehicle or of an imaging system;
   determining a scan-line-image-parameter level for each of the scan lines, the scan-line-image-parameter level comprising a color-related parameter level; and
   identifying a preferential heading of the vehicle that is generally aligned with respect to a crop feature, associated with the collected image data, based on the determined scan-line-image-parameter level meeting or exceeding a maximum value or minimum threshold value;
   estimating, by a data processor, a reliability of the vehicle heading based on compliance with an image parameter level criteria associated with one or more crop rows;
   determining a first image parameter value associated with a first crop row and a second image parameter value associated with a second crop row;
   determining a spacing between a first crop row and a second crop row; and
   determining a maximum image parameter value for the first crop row and the second crop row; and
   considering vision guidance data reliable for a time period if the first image parameter value does not differ from the second image parameter value by more than a minimum threshold, if the determined spacing between the first crop row and the falls within a defined width range, and if the maximum image parameter value is greater than a certain threshold value.

2. The method according to claim 1 wherein the image parameter level is associated with or derived from one or more of the following: a color value of a red component, green component, or blue component in RGB color space; a composite color value of multiple components in RGB color space, a hue value in the HSV color space; a hue value in the HSL color space; a saturation value associated with vibrancy or purity of a color, a saturation value in HSV or HSL color space, a value indicative of observed or reflected light in the green visible light spectrum or for another plant color; a value indicative of observed or reflected light with certain green hue value or another plant color; and a value indicative of observed or reflected light in multiple spectrums (e.g., green light and infra-red or near infra-red light), an NDVI (normalized difference vegetation index), a greenness level, a plant color level, and a green-red difference level.

3. The method according to claim 1 further comprising:
   determining the first image parameter value associated with the first crop row and the second image parameter value associated with the second crop row; and
   considering vision guidance data unreliable for a minimum time period if the first image parameter value differs from the second image parameter value by more than a minimum threshold.

4. The method according to claim 1 further comprising:
   determining the spacing between the first crop row and the second crop row; and
   considering vision guidance data unreliable for a minimum time period if the spacing does not fall within a defined row width range.

5. The method according to claim 1 further comprising:
determining the maximum image parameter value for the first crop row and the second crop row; and
considering vision guidance data unreliable for a minimum time period if the maximum image parameter value is not greater than a certain threshold value.

6. The method according to claim 1 further comprising:
determining the first image parameter value associated with the first crop row and the second image parameter value associated with the second crop row: and
applying alternate guidance data other than vision guidance data for a minimum time period if the first image parameter value differs from the second image parameter value by more than a minimum threshold.

7. The method according to claim 1 further comprising:
determining the spacing between the first crop row and the second crop row; and
applying alternate guidance data other than vision guidance data for a minimum time period if the spacing does not fall within a defined row width range.

8. The method according to claim 1 further comprising:
determining the maximum image parameter value for the first crop row and the second crop row; and
applying alternate guidance data other than vision guidance data for a minimum time period if the maximum image parameter value is not greater than a certain threshold value.

9. The method according to claim 1 further comprising:
determining the first image parameter value associated with the first crop row and the second image parameter value associated with the second crop row; and
considering vision guidance data unreliable for a minimum time period if the first image parameter value and the second image parameter value do not comply with the individual predetermined threshold, an aggregate predetermined threshold, or both.

10. The method according to claim 1 further comprising:
determining an offset from a desired path; and
determining the vision guidance data is reliable if the determined offset is less than or equal to a maximum offset value.

11. A system of guiding a vehicle, the system comprising:
an imaging device for collecting color image data;
a definer for defining a series of scan line segments generally perpendicular to a transverse axis of the vehicle or of an imaging system;
an intensity evaluator for determining a scan-line-image-parameter level for each of the scan lines, the scan-line-image-parameter level comprising a color-related parameter level, wherein the intensity evaluator determines a first image parameter value associated with a first crop row and a second image parameter value associated with a second crop row, the intensity evaluator determining a maximum image parameter value for the first crop row and the second crop row;
an alignment detector for identifying a preferential heading of the vehicle that is generally aligned with respect to a crop feature, associated with the collected image data, based on the determined scan-line-image-parameter level meeting or exceeding a maximum value or minimum threshold value;
a reliability estimator for estimating a reliability of the vehicle heading based on compliance with an image parameter level criteria associated with one or more crop rows;
a data processor determining a spacing between a first crop row and a second crop row; and
the reliability estimator considering vision guidance data reliable for a time period if the first image parameter value does not differ from the second image parameter value by more than a minimum threshold, if the determined spacing between the first crop row falls within a defined width range, and if the maximum image parameter value is greater than a certain threshold value.

12. The system according to claim 11 wherein image parameter level is associated with or derived from one or more of the following: a color value of a red component, green component, or blue component in RGB color space; a composite color value of multiple components in RGB color space, a hue value in the HSV color space; a hue value in the HSL color space; a saturation value associated with vibrancy or purity of a color, a saturation value in HSV or HSL color space, a value indicative of observed or reflected light in the green visible light spectrum or for another plant color; a value indicative of observed or reflected light with certain green hue value or another plant color; and a value indicative of observed or reflected light in multiple spectrums (e.g., green light and infra-red or near infra-red light), an NDVI (normalized difference vegetation index), a greenness level, a plant color level, and a green-red difference level.

13. The system according to claim 11 wherein the intensity evaluator determines the first image parameter value associated with the first crop row and the second image parameter value associated with the second crop row; and
the reliability estimator considering vision guidance data unreliable for a minimum time period if the first image parameter value differs from the second image parameter value by more than a minimum threshold.

14. The system according to claim 11 wherein the intensity evaluator determines the spacing between the first crop row and the second crop row; and
the reliability estimator considering vision guidance data unreliable for a minimum time period if the spacing does not fall within a defined row width range.

15. The system according to claim 11 wherein the intensity evaluator determines the maximum image parameter value for the first crop row and the second crop row; and
the reliability estimator considering vision guidance data unreliable for a minimum time period if the maximum image parameter value is not greater than a certain threshold value.

16. The system according to claim 11 wherein the intensity evaluator determines the first image parameter value associated with the first crop row and the second image parameter value associated with the second crop row: and
a vehicle guidance controller applying alternate guidance data other than vision guidance data for a minimum time period if the first image parameter value differs from the second image parameter value by more than a minimum threshold.

17. The system according to claim 11 wherein the intensity evaluator determines the spacing between the first crop row and the second crop row; and
a vehicle guidance controller applying alternate guidance data other than vision guidance data for a minimum time period if the spacing does not fall within a defined row width range.

18. The system according to claim 11 wherein the intensity evaluator determines the maximum image parameter value for the first crop row and the second crop row; and
a vehicle guidance controller applying alternate guidance data other than vision guidance data for a minimum time period if the maximum image parameter value is not greater than a certain threshold value.

19. The system according to claim 11 wherein the intensity evaluator determines the first image parameter value associated with the first crop row and the second image parameter value associated with the second crop row; and
- a vehicle guidance controller considering vision guidance data unreliable for a minimum time period if the first image parameter value and the second image parameter value do not comply with the individual predetermined threshold, an aggregate predetermined threshold, or both.

20. The system according to claim 11 further comprising:
- an offset calculator for determining an offset from a desired path; and
- a reliability estimator for determining the vision guidance data is reliable if the determined offset is less than or equal to a maximum offset value.

* * * * *